United States Patent
Uruno et al.

(10) Patent No.: US 6,256,443 B1
(45) Date of Patent: Jul. 3, 2001

(54) OPTICAL FIBER DISTRIBUTION MODULE FOR HOLDING AN OPTICAL FIBER CORD AND FIBER DISTRIBUTION SYSTEM USING OPTICAL FIBER CORDS

(75) Inventors: Shigenori Uruno, Ibaraki-ken; Masao Tachikura, Hitachi; Hisashi Izumita, Hitachinaka; Koji Mine; Yoshitaka Enomoto, both of Tsukuba; Naoki Nakao, Chiba; Nobuo Tomita, Jyouboku-machi; Akira Hirooka, Tsukuba; Hajime Takemoto, Nabari, all of (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/358,392

(22) Filed: Jul. 20, 1999

(30) Foreign Application Priority Data

Jul. 24, 1998 (JP) .................................................. 10-209453
Mar. 10, 1999 (JP) .................................................. 11-063238
Jun. 10, 1999 (JP) .................................................. 11-163533

(51) Int. Cl.⁷ .................................................. G02B 6/00
(52) U.S. Cl. .................................................. 385/134
(58) Field of Search ................................... 385/134, 135, 385/136, 137, 138, 147

(56) References Cited

U.S. PATENT DOCUMENTS 5,052,775 * 10/1991 Bossard et al. ........................ 385/76
5,353,367    10/1994 Czosnowski et al. .

(List continued on next page.)

FOREIGN PATENT DOCUMENTS

| 33 08 682 | 9/1984 | (DE) . |
| 0 562 259 | 9/1993 | (EP) . |
| 0 719 058 | 6/1996 | (EP) . |
| 0 724 367 | 7/1996 | (EP) . |
| 0 849 602 | 6/1998 | (EP) . |
| 1-138520 | 5/1989 | (JP) . |
| 2-1632 | 1/1990 | (JP) . |

(List continued on next page.)

OTHER PUBLICATIONS

N. Tomita et al., "High–Speed & High–Capacity Technologies of Optical Fiber Line Testing System", Technical Report of IEICE (The Institute of Electronics Information and Communication Engineers), CS95–50, pp59–66 (1995–06).

Primary Examiner—Akm E. Ullah
(74) Attorney, Agent, or Firm—Burns Doane Swecker & Mathis LLP

(57) ABSTRACT

An optical fiber distribution module having a connection board, optical connector adaptors and a storage section is provided. An array of the optical connector adaptors forms the connection board, where the optical connectors connect in-use optical fibers. The storage section, located in a separate section of the module, stores optical fibers which are not-in use. The optical fiber distribution module also includes a plurality of cord sorting boards having a plurality of fiber cord passageways. The fiber cord passageways are configured to accommodate and retain at least one optical fiber such that the optical fiber is arranged between the connection board and the storage section. In addition, both the in-use and not-in use optical fibers insert into the fiber cord passageway. The in-use optical fibers connect to the optical connector adaptors and the not-in use optical fibers are stored in the storage section as the in-use optical fibers and the not-in use optical fibers are inserted within the fiber cord passageways.

30 Claims, 19 Drawing Sheets

U.S. PATENT DOCUMENTS

| | | | |
|---|---|---|---|
| 5,402,515 | * | 3/1995 | Vidacovich et al. .................. 385/135 |
| 5,448,015 | | 9/1995 | Jamet et al. . |
| 5,513,293 | | 4/1996 | Holland et al. . |
| 5,758,003 | | 5/1998 | Wheeler et al. . |
| 5,784,516 | * | 7/1998 | Parzygnat et al. .................... 385/134 |
| 5,838,845 | * | 11/1998 | Leone et al. ........................... 385/16 |

FOREIGN PATENT DOCUMENTS

| | | |
|---|---|---|
| 5-107416 | 4/1993 | (JP) . |
| 5-341214 | 12/1993 | (JP) . |
| 6-181584 | 6/1994 | (JP) . |
| 9-74382 | 3/1997 | (JP) . |

* cited by examiner

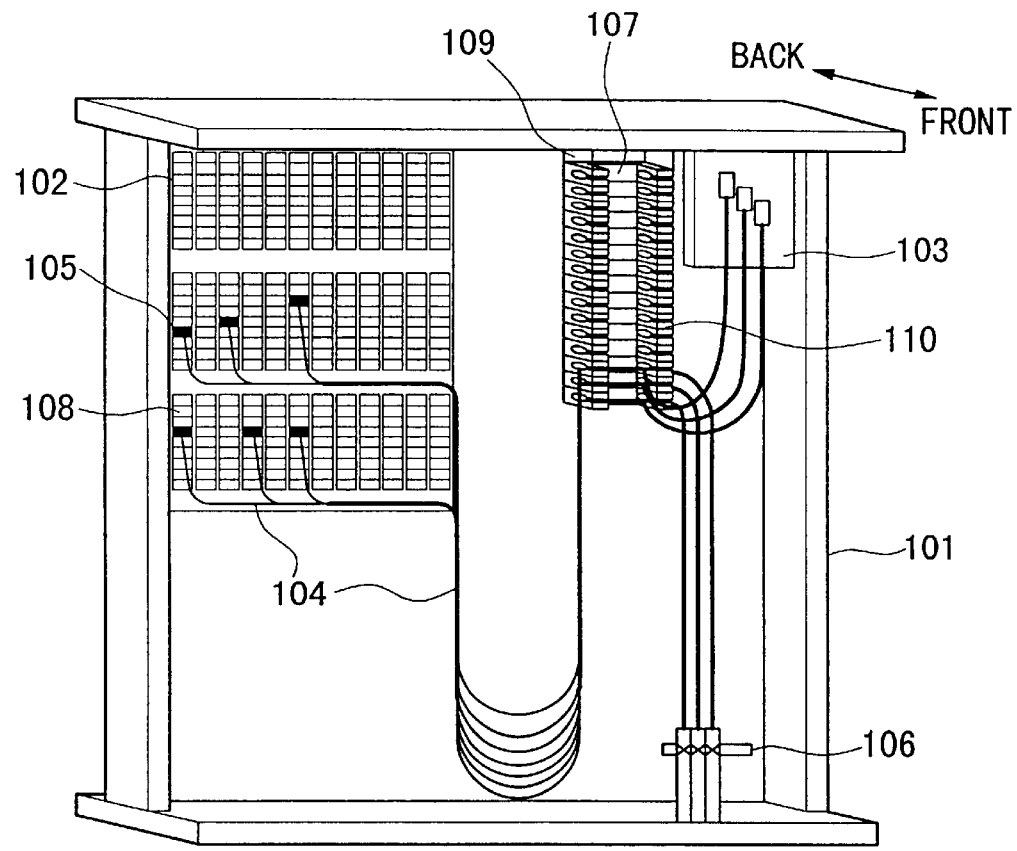
FIG._1
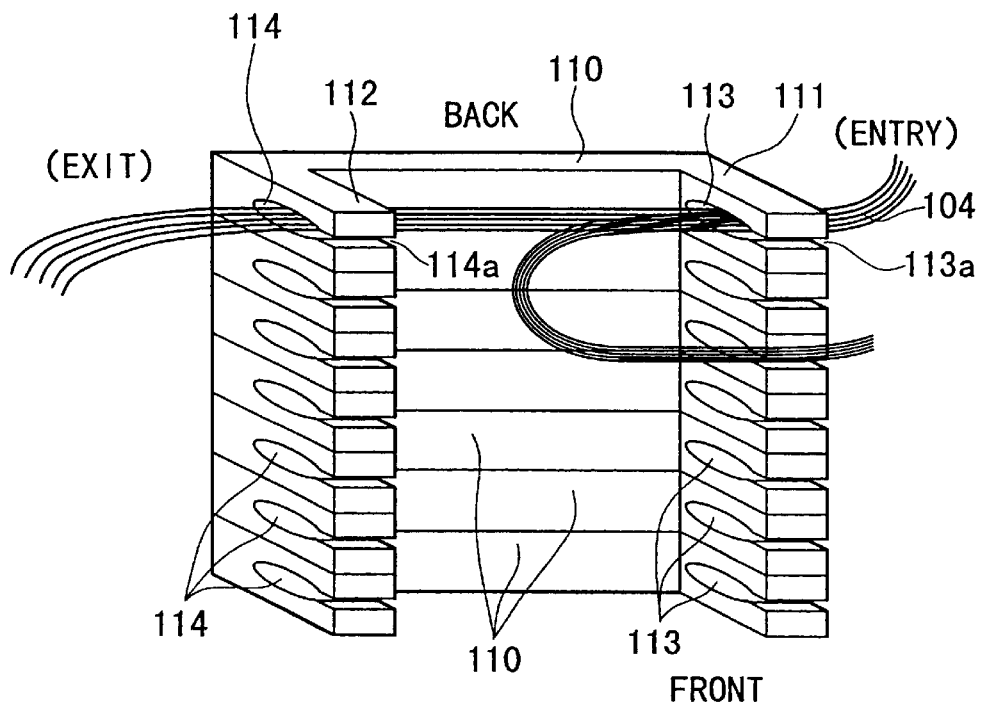
FIG._2

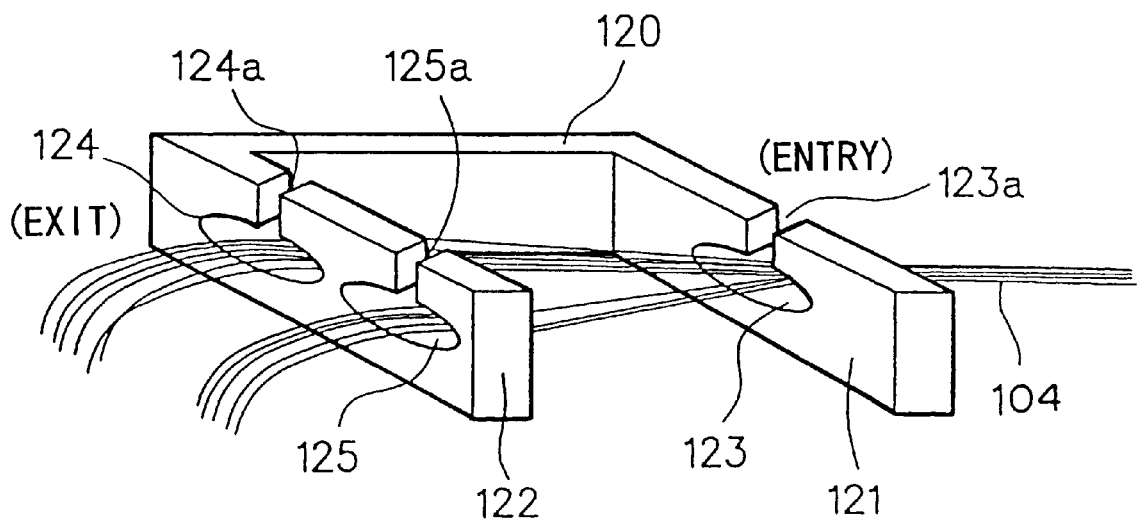
FIG._3
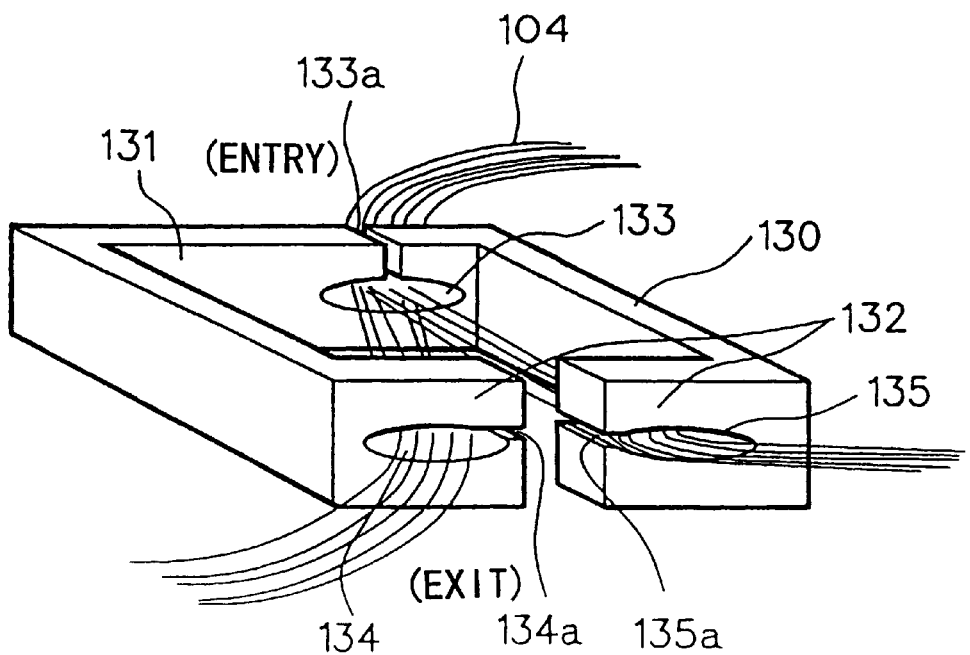
FIG._4

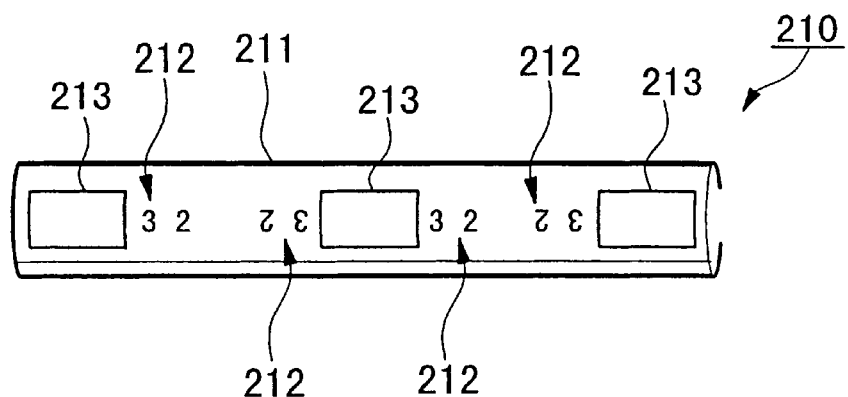
FIG._5
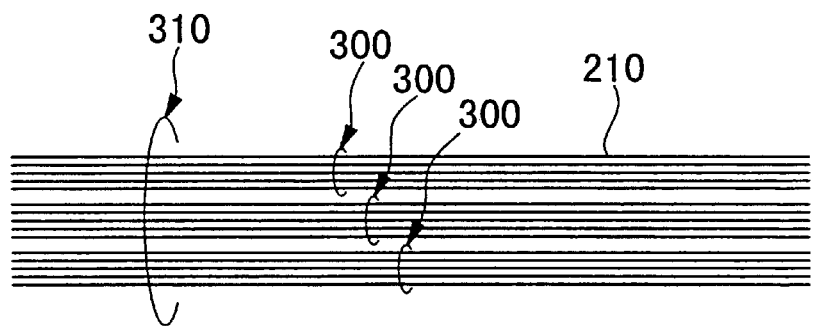
FIG._6A
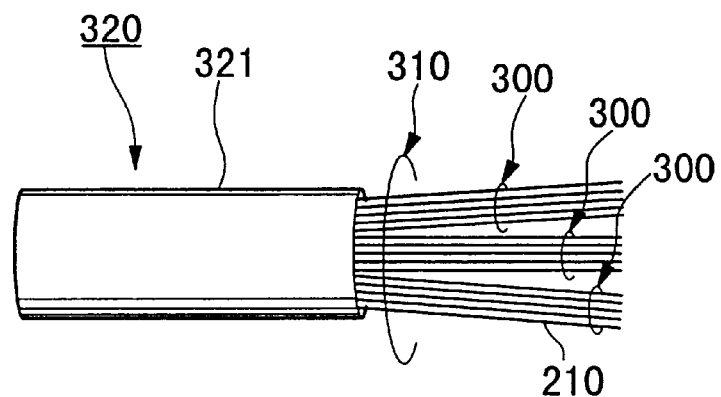
FIG._6B

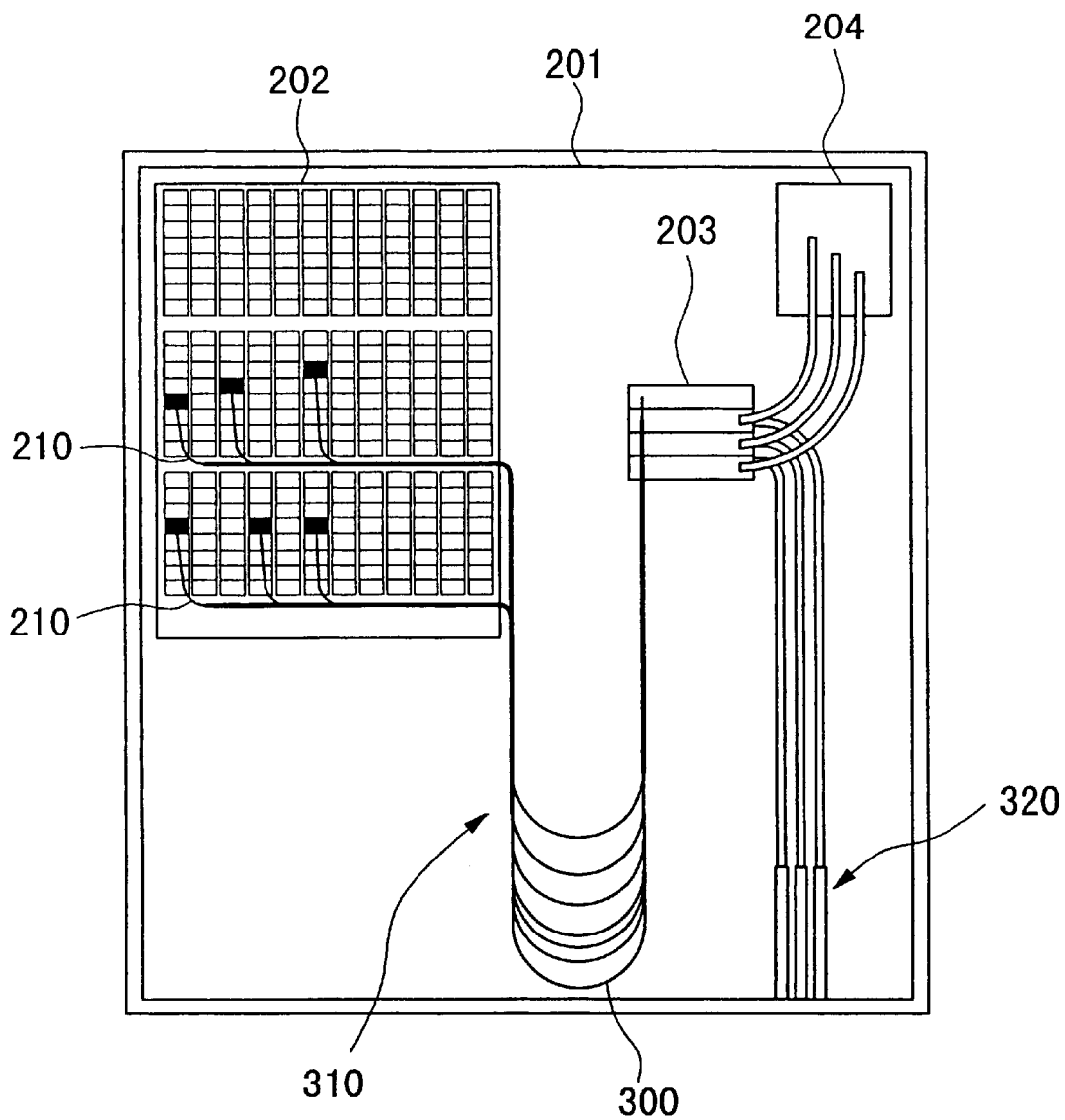
FIG._7

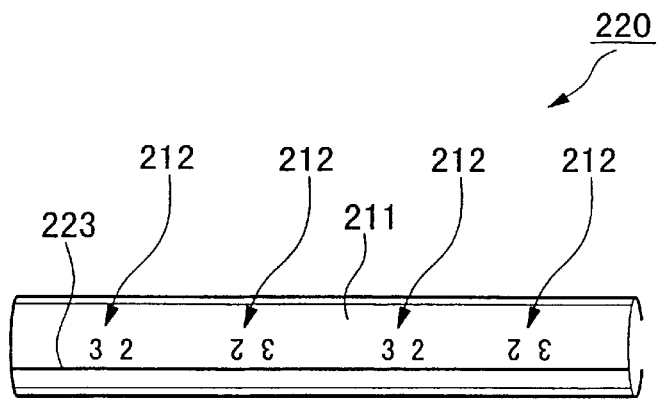
FIG._8
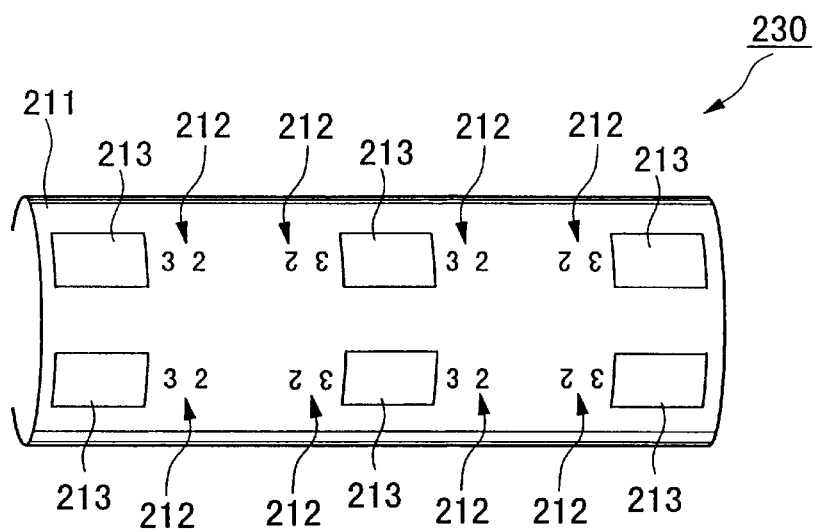
FIG._9
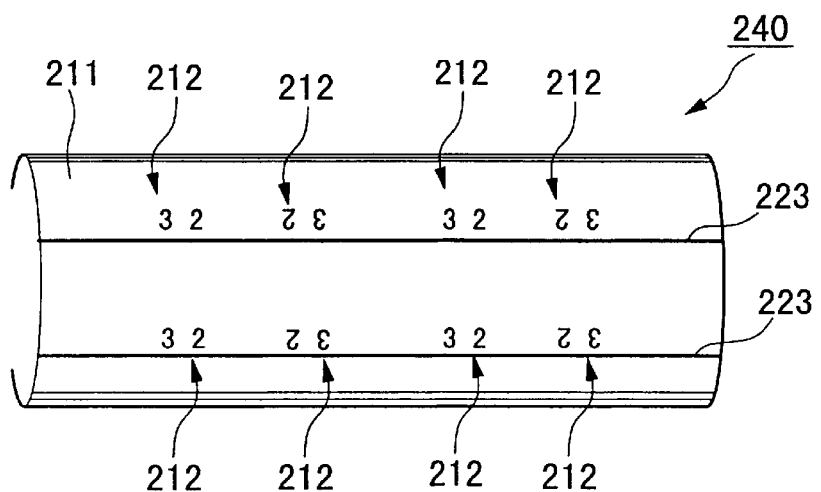
FIG._10

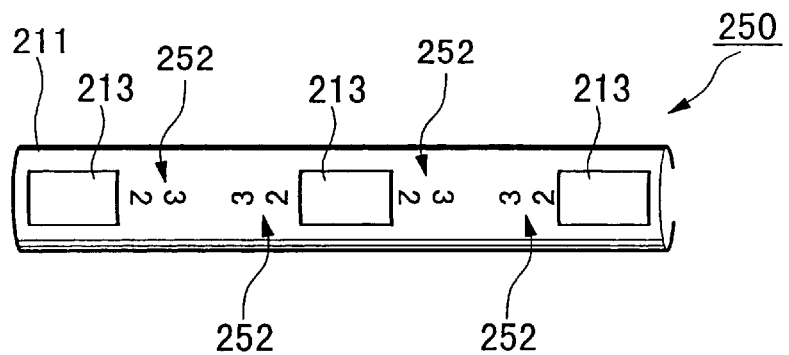
FIG._11
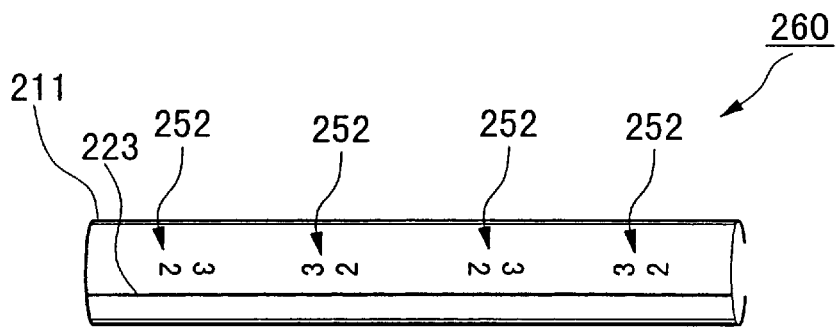
FIG._12
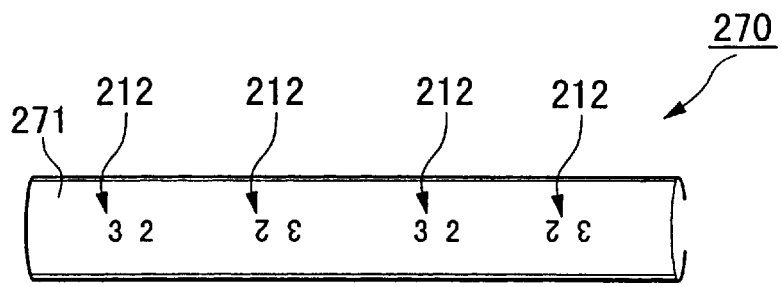
FIG._13
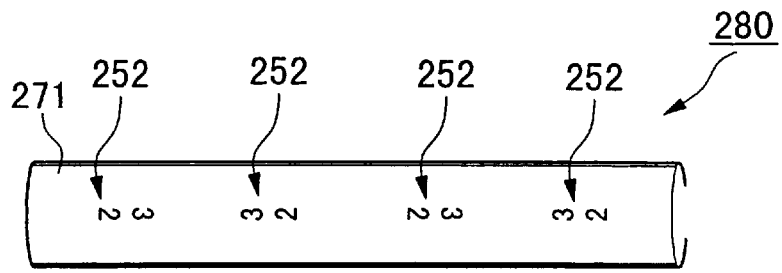
FIG._14

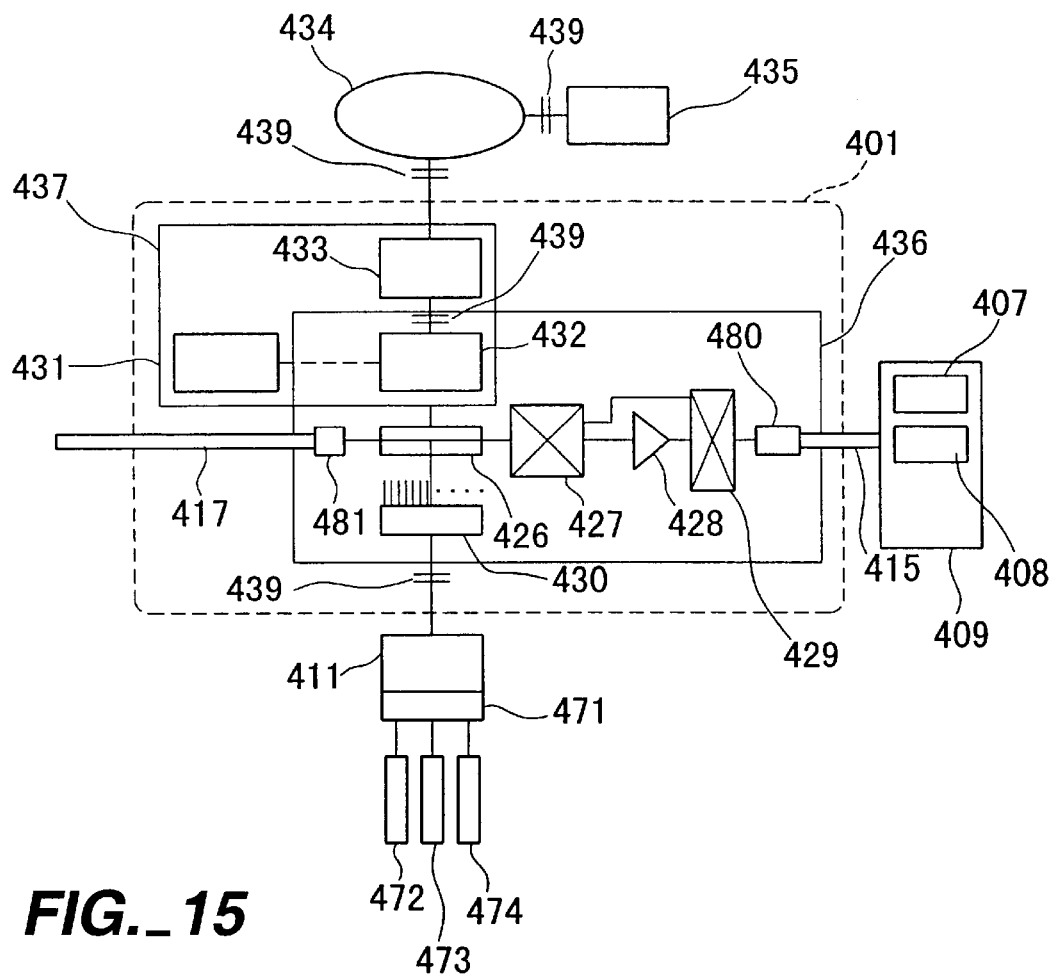
FIG._15
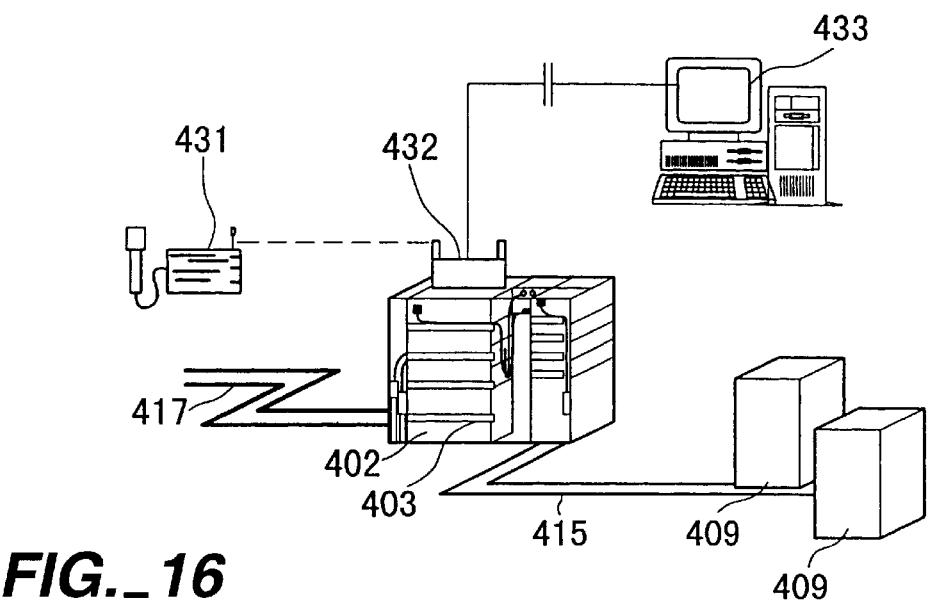
FIG._16

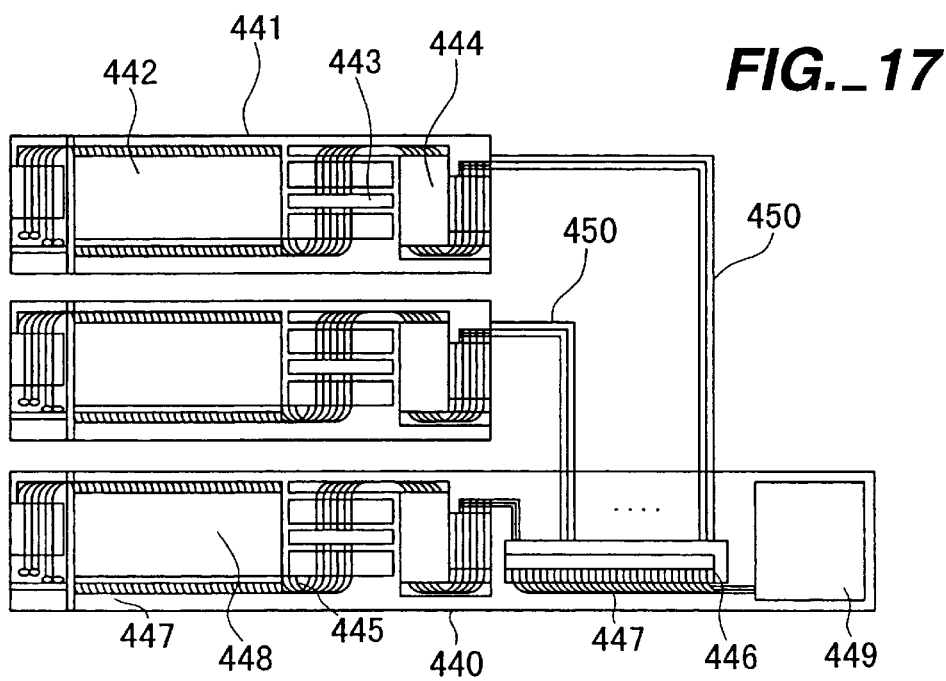
FIG._17
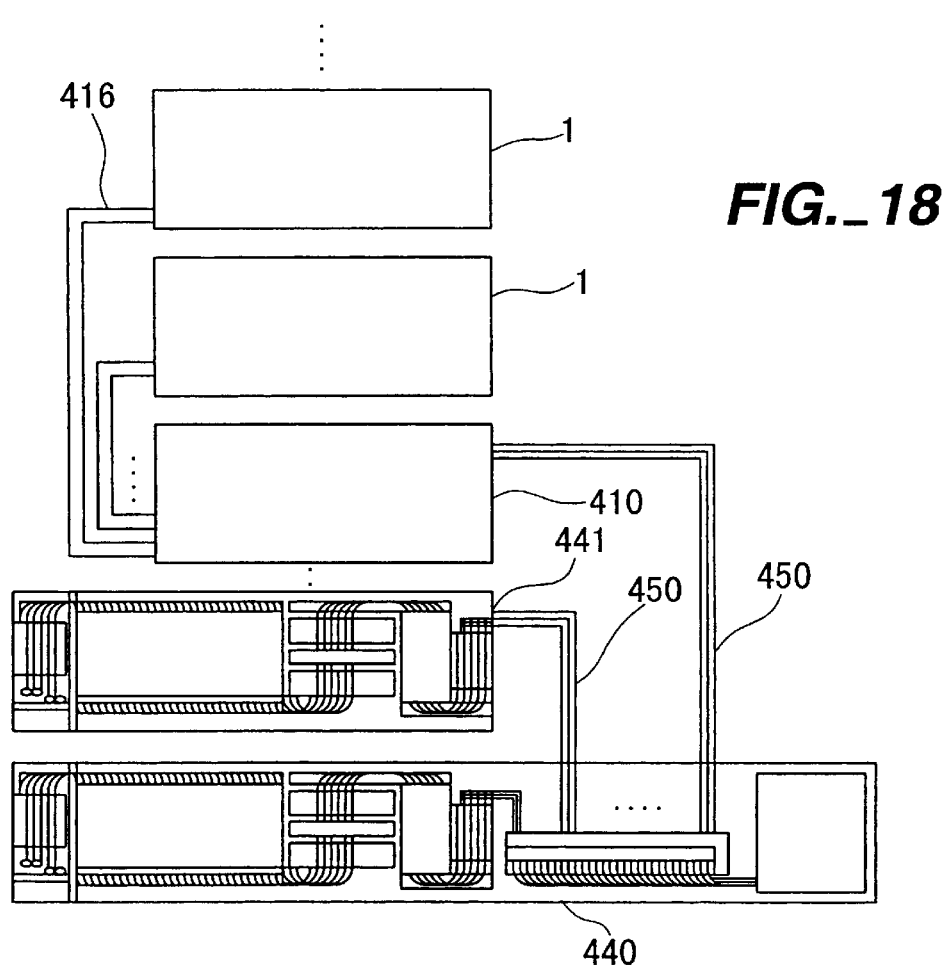
FIG._18

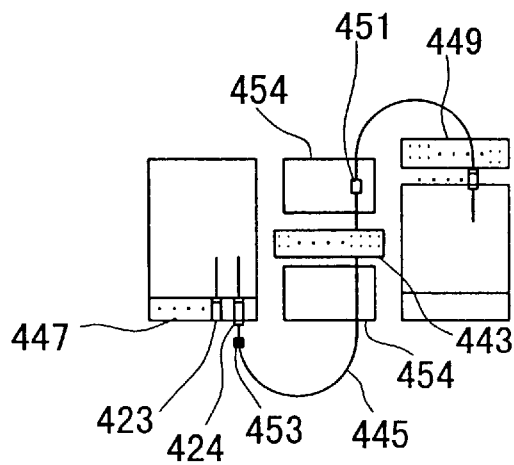
FIG._19A
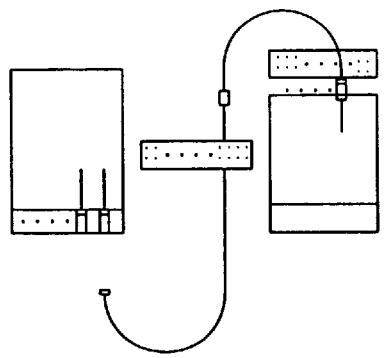
FIG._19B
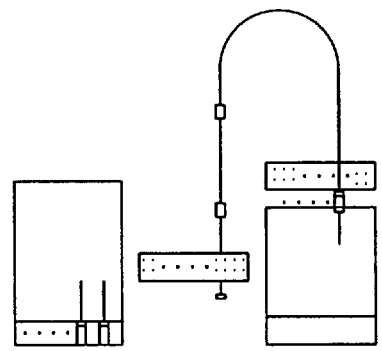
FIG._19C
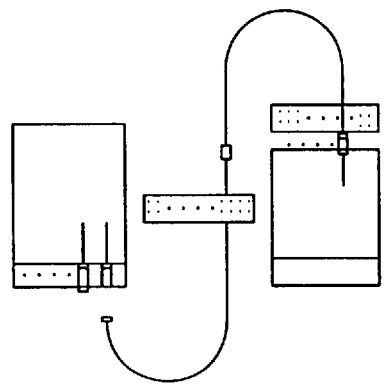
FIG._19D
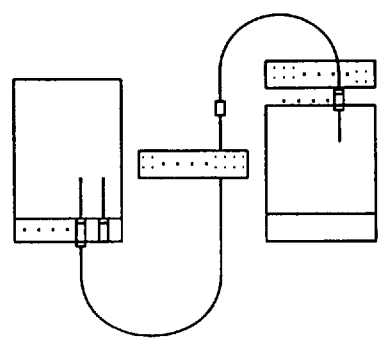
FIG._19E

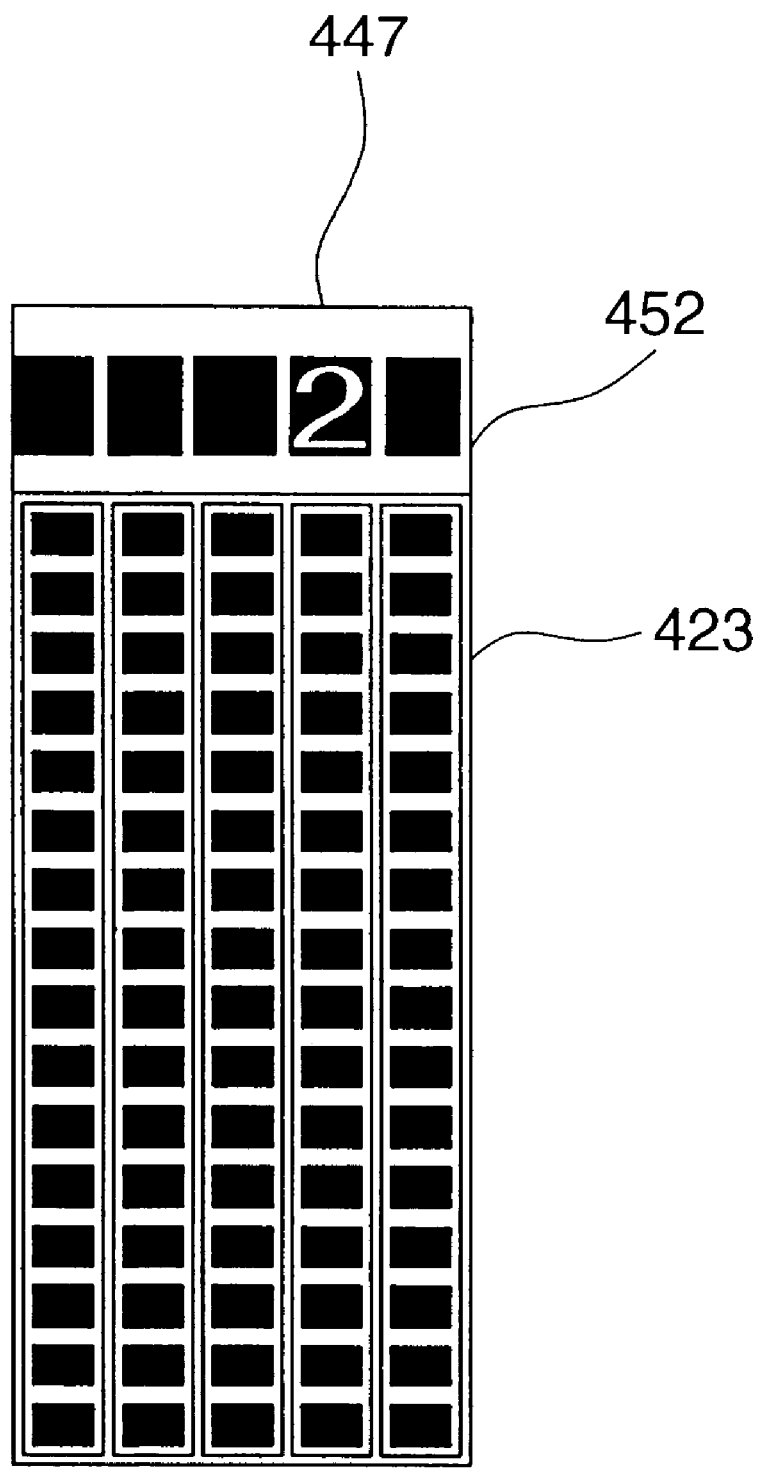
FIG._20

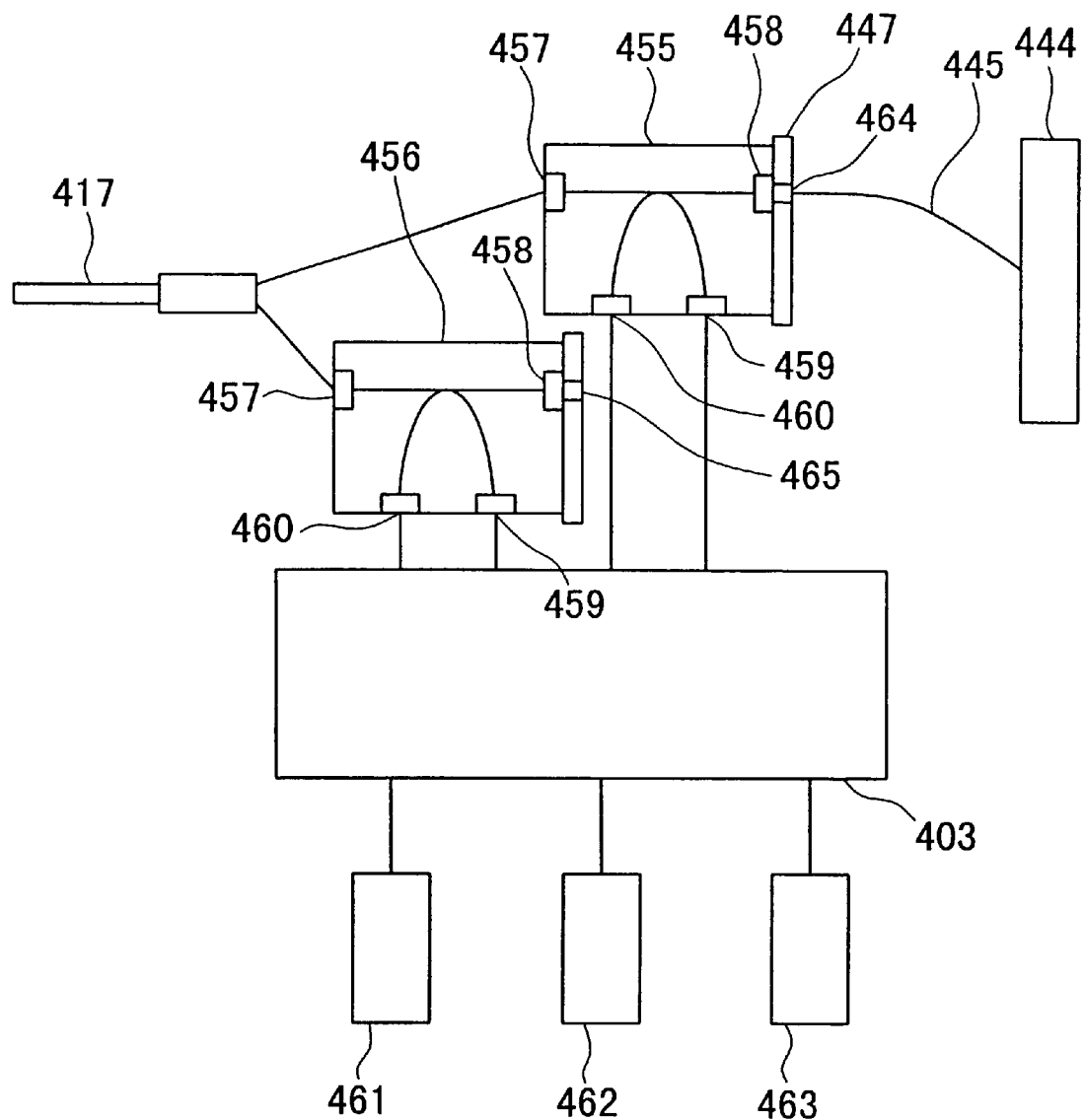
FIG._21

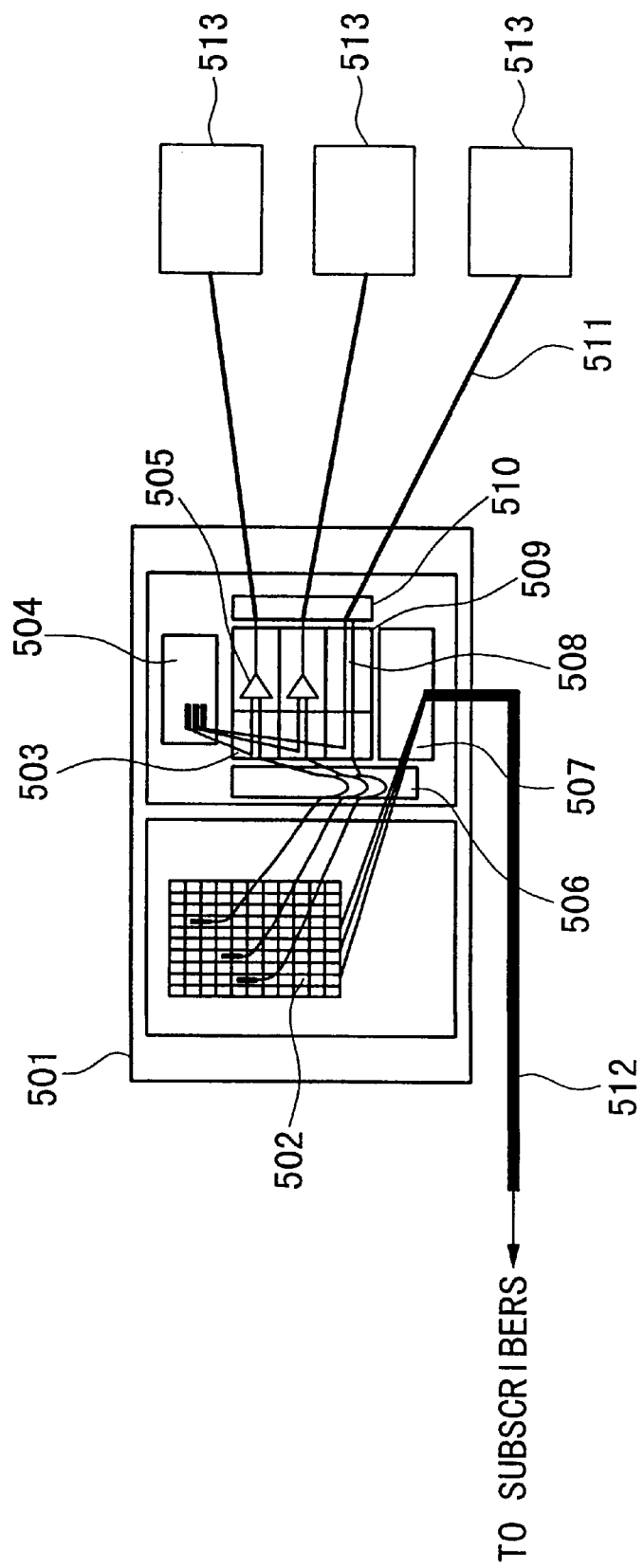
FIG._22

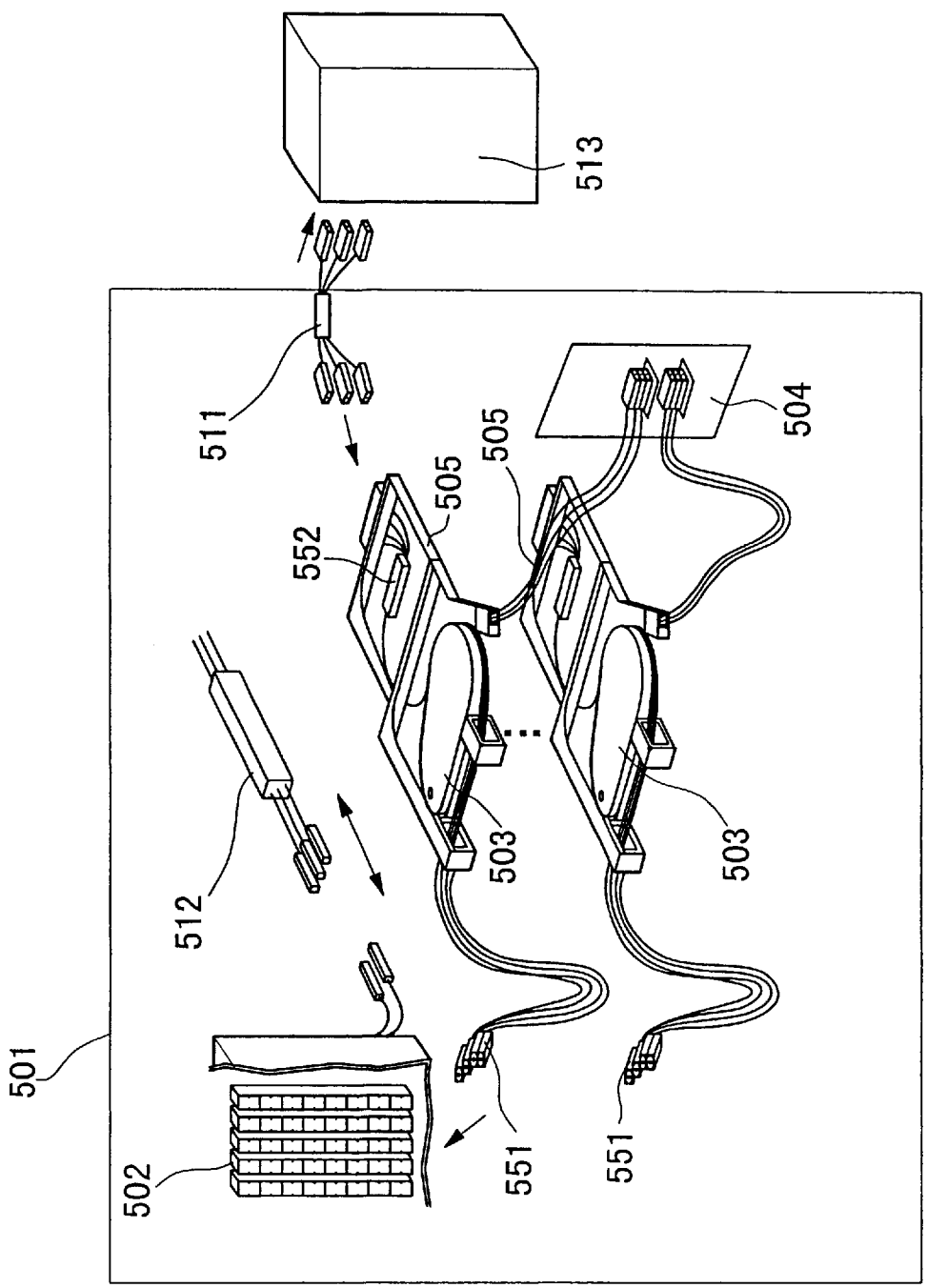
FIG._23

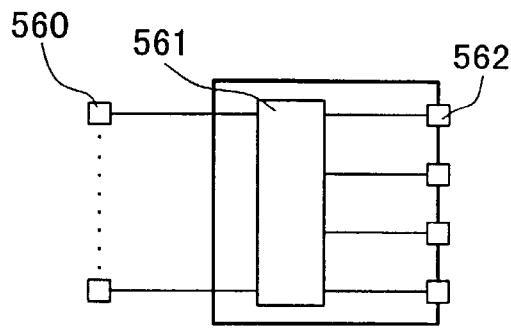
FIG._24A
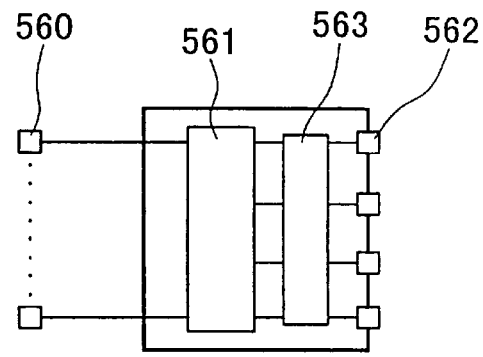
FIG._24B
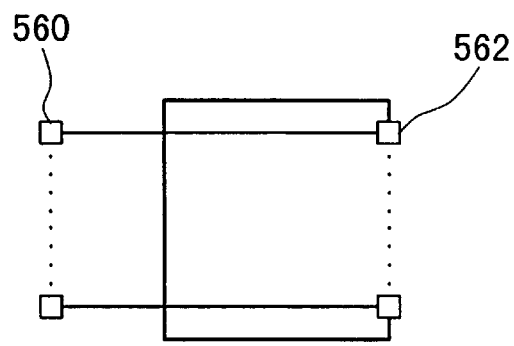
FIG._25A
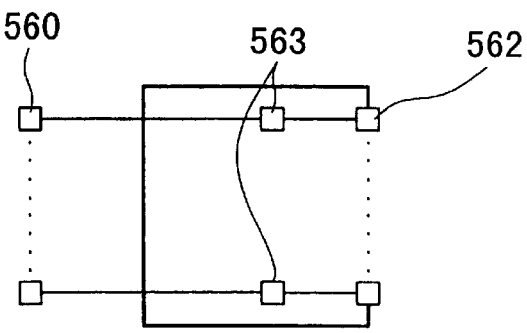
FIG._25B

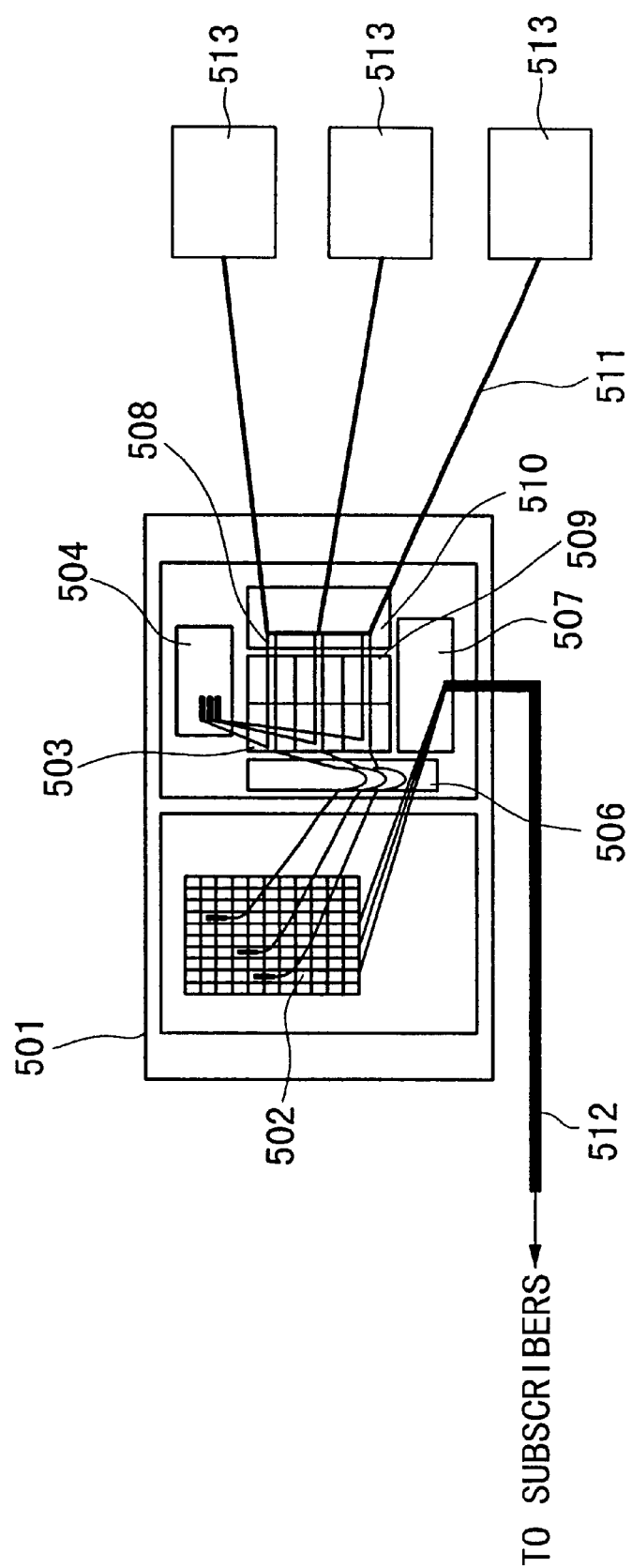
FIG._26

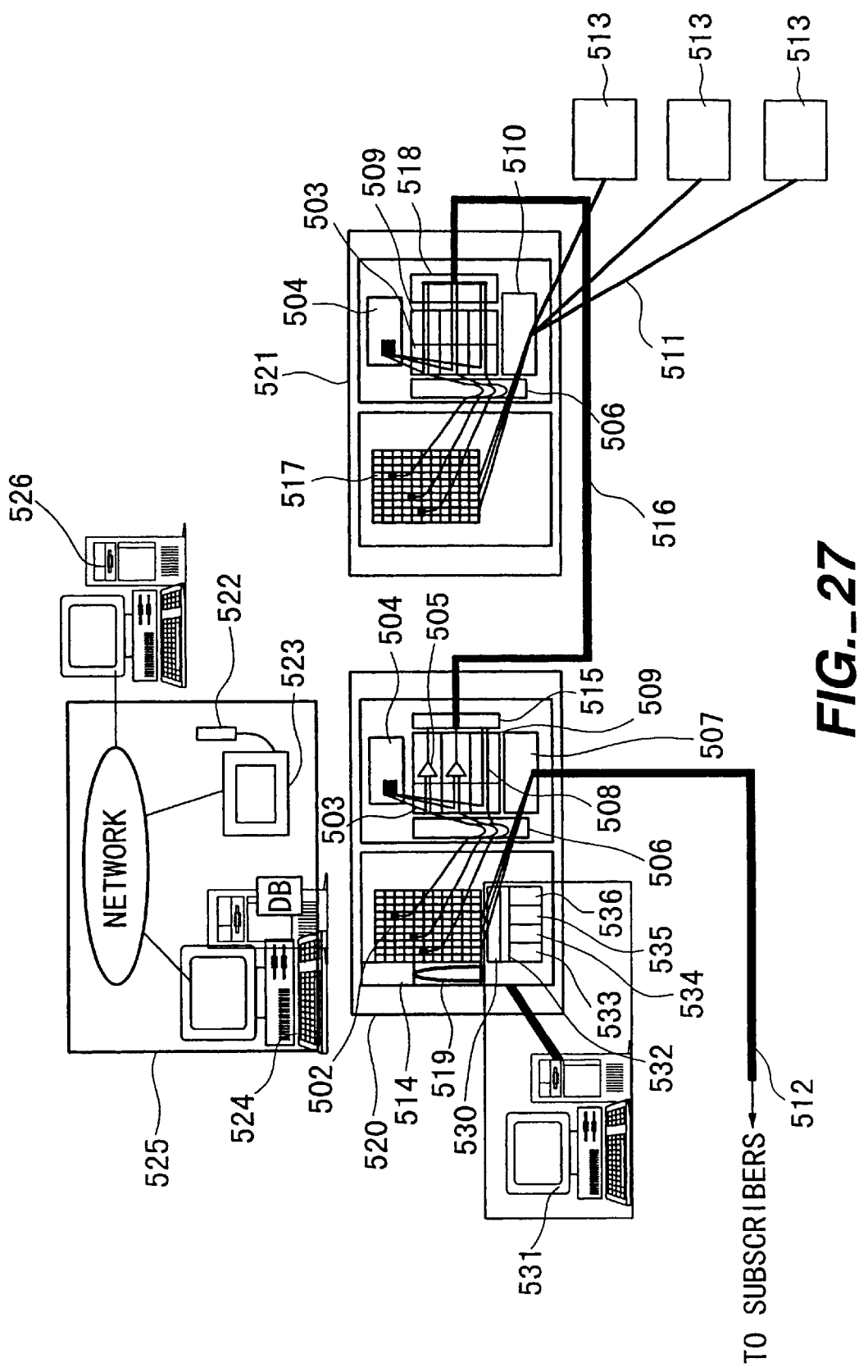
FIG._27

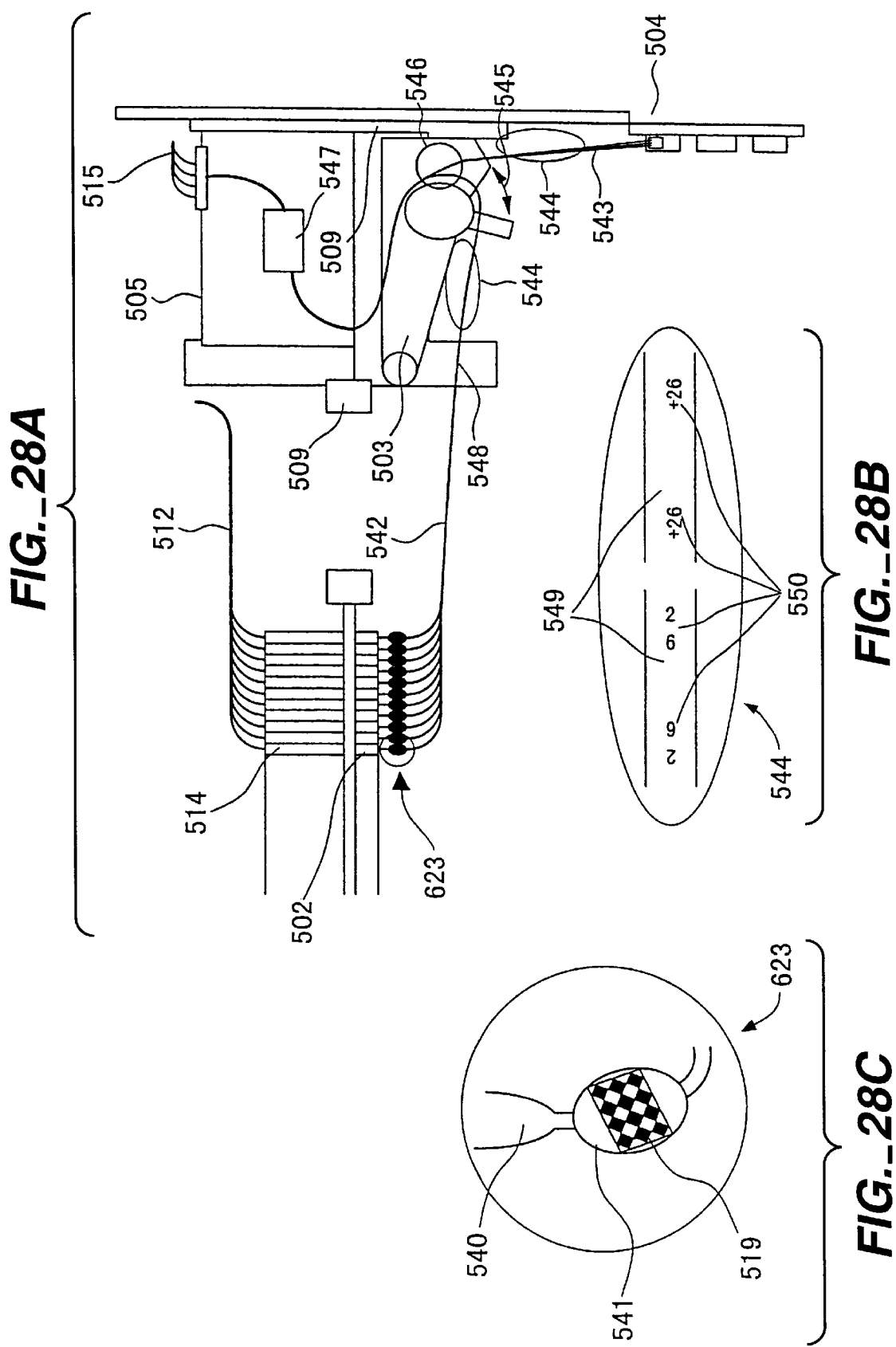

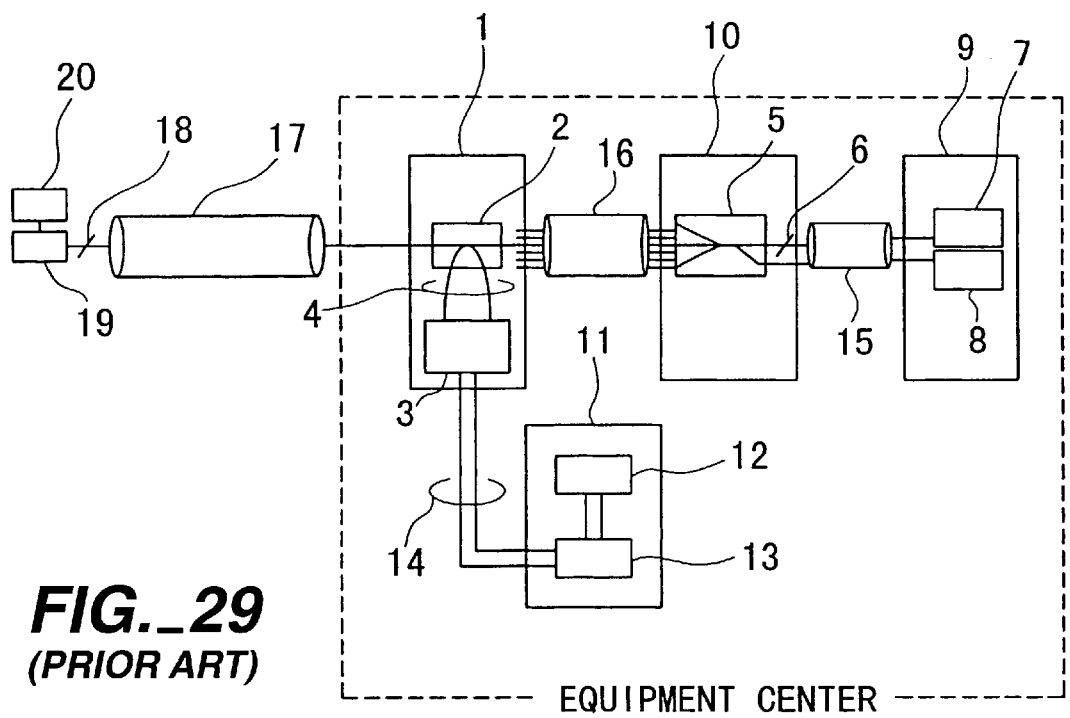
FIG._29
(PRIOR ART)
EQUIPMENT CENTER
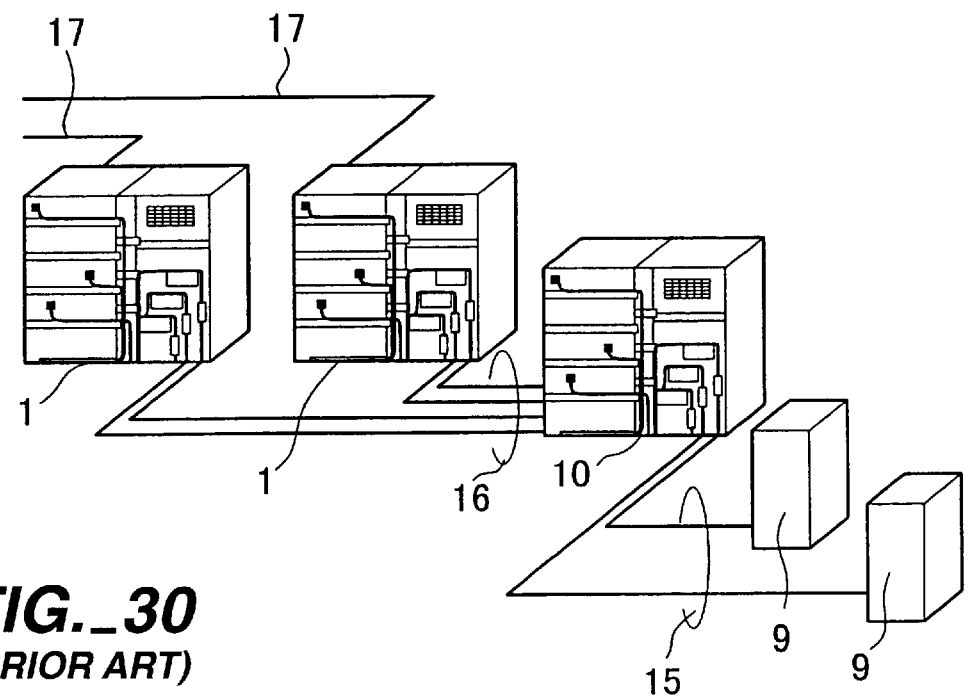
FIG._30
(PRIOR ART)

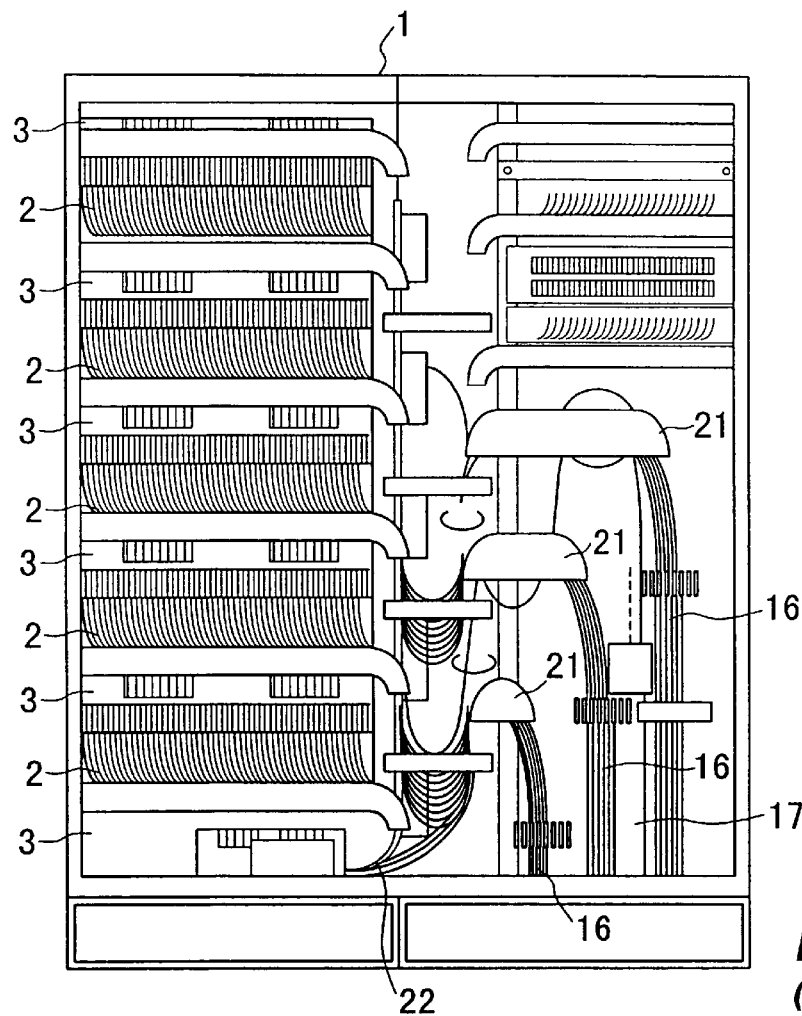
FIG._31
(PRIOR ART)
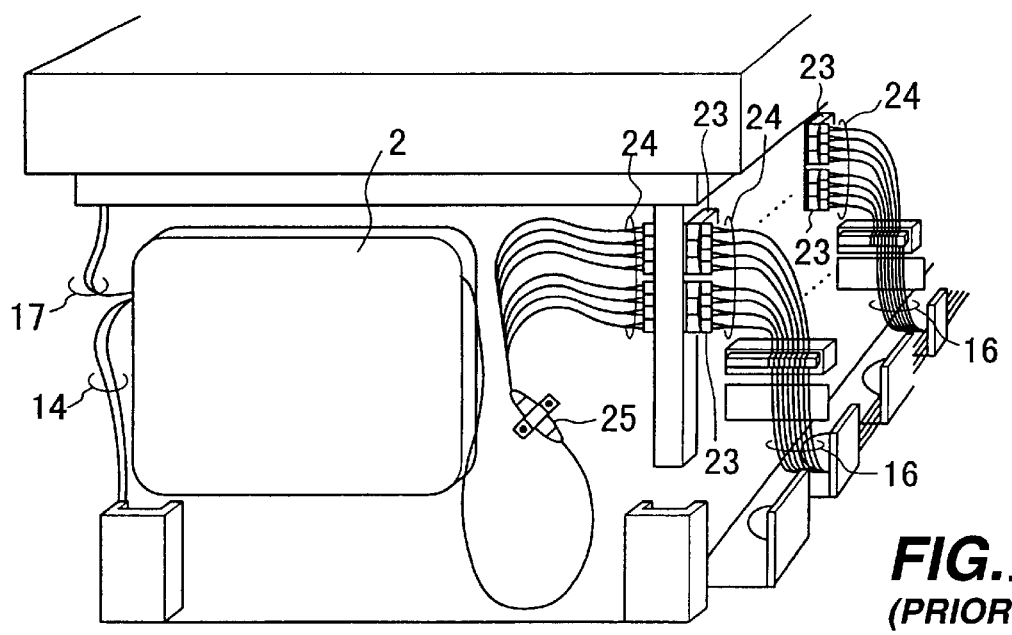
FIG._32
(PRIOR ART)

OPTICAL FIBER DISTRIBUTION MODULE FOR HOLDING AN OPTICAL FIBER CORD AND FIBER DISTRIBUTION SYSTEM USING OPTICAL FIBER CORDS

BACKGROUND OF THE INVENTION

1. Field of the Invention

The present invention relates to an optical fiber distribution module for connecting or exchanging connections of multi-core optical fibers, a single-fiber optical cord and a set-type optical fiber cords, and an optical fiber distribution system for managing operating information of a network connecting outdoor optical facilities with optical communication equipment in a telecommunication equipment center so that the system may be operated at its peak efficiency.

2. Description of the Related Art

Conventional optical fiber distribution module has a connection board with an array of connector adaptors, and a holding board for storing those fiber cords with connector plugs that are not in use, and connections or switching requires the following three basic operations.

(1) Connect a plug of a stored optical fiber cord to a desired adaptor on the connection board.

(2) Change a connection by disconnecting a plug from the connection board and connecting it to another adaptor.

(3) Disconnect a plug connected to an adaptor on the connection board and store the plug on the holding board.

However, when such operations are repeatedly performed, many fiber cords become tangled, such that (1) Entangled cords are hard to handle and the effective length becomes too short to reach the desired location of the adaptor;

(2) The weight of many fiber cords hanging from each other tends to load the fiber cord to distort the shape of the optical fiber inside the cord; and (3) The force applied to a fiber is transmitted to the connection section of the plug attached to the end of the cord to increase optical signal attenuation; thus resulting in difficulty of achieving higher fiber density for the optical fiber distribution module.

Also, in some case, a set-type fiber cords, such as optical cable, are used for distribution of light signals on the fiber distribution board.

A set-type fiber cord is produced by bundling a plurality of fiber units, each unit containing several fiber cords.

Such set-type fiber cords are given identifying markings to enable to identify individual fiber cords within the cord unit, and such markings may be imprinted directly on the sheath for the cord, or indicated on a ring attached to the cord.

With the expansion of the optical fiber communication network, needs for switching the tangled fibers arise frequently, and a serious fiber congestion is experienced in the vicinity of the fiber sorting board, which is used to retain individual cords of the set-type fiber cords by the congregation of in-use fibers and not-in-use fibers which are stored in the holding board. Therefore, it is essential that individual fiber cords be clearly identifiable, particularly for the set-type fiber cords.

However, conventional set-type fiber cords allows identification of individual fiber cords within a given cord unit, but because the markings are the same for different units, it has been difficult to identify a particular fiber cord when the fiber units are debundled.

Especially, when such set-type fiber cords are used for fiber distribution purposes, fiber connections and fiber switching are made to different locations on the connection board on the basis of individual fibers, the bundle must be released before any particular fiber can be connected or switched to a specific adaptor.

Also, in equipment centers in a high density optical network, external fibers must be connected to internal fibers within the center using fiber termination modules (FTMs); and a distribution system is used to mange such fiber connections inside the centers.

Some examples of conventional FTMs will be presented in the following.

In general, FTMs are installed at the connection points between outdoor optical fiber cables in the subscriber loops and the indoor optical fiber cables in the central office. Examples of the conventional FTMs are reported in references (N. Tomita et al; "High-Speed & High-Capacity Technologies of Optical Fiber Line Testing System", TECHNICAL REPORT OF IEICE (THE INSTITUTE OF ELECTRONICS INFORMATION AND COMMUNICATION ENGINEERS), CS95-50, pp59–66).

FIG. 29 shows an example of the configuration of the center equipment including the conventional FTM. The system comprises: FTM 1; optical coupler 2; fiber selector (FS); test light introducing fibers 4 to the optical coupler 2; optical splitter 5; center-side optical filter 6; center communication equipment 7; center imaging equipment 8; transmission equipment units 9; star coupler units 10; test equipment modules 11; test instruments 12; fiber testing and equipment selection apparatus (FTES) 13; FS master-side optical fiber 14; fist indoor optical fiber cable 15; second indoor optical fiber cable 16; subscriber optical fiber cable 17; user-side optical filter 18; user-side data terminating unit 19; and user-side image terminating unit 20.

FIG. 29 shows a communication service system used for transmission of data and images. To provide high reliability, the equipment centers are provided with FTMs 1, transmission equipment units 9, star coupler modules 10, and TEMs 11.

Center communication equipment 7 used for data communication operate on signal light of a 1.3 μm band and a 1.55 μm band for imaging signals output from center image equipment 8 are injected in the star coupler module 10 through the first internal fiber cable 15. The optical splitter 5 in the star coupler 10 wavelength multiplexes the 1.3 μm and 1.55 μm band signals, and wavelength multiplexed signal is distributed to a plurality of output ports. Signal light output from the ports of the splitter 5 is input in the FTM 1 through the second internal cable 16. Signal light input in the FTM 1 passes through the optical coupler 2 which multi/demultiplexes test light, and is wavelength multiplexed to user-side data terminating unit 19 and user-side image terminating unit 20 through the subscriber cable 17, to be delivered as data and image transmission service.

Tests to be conducted from the equipment center when installing or maintaining optical cable will be explained in the following. The fiber selector 3 in the fiber test module 1 selectively couples test light splitting fibers 4 and the fiber selector master-side fiber 14 connected to the test apparatus 12 in the test equipment module 11. The fiber testing and equipment selection apparatus 13 in the FEM 11 selects the optical pulse tester in the test apparatus 12. By this process, test light from the optical pulse tester is injected in the subscriber cable 17, and signal loss distribution measurements and problem location searching are performed.

When performing the tests, to prevent test light from entering in the user-side data terminating unit 19 and user-side image terminating unit 20, the user-side optical filter 18 for blocking the test light and transmitting the signal light is disposed just ahead of the user-side data terminating unit 19 and the user-side image terminating unit 20. Also, to prevent test light and reflected light of the 1.55 μm band output from the center image equipment 8 from entering in the center communication equipment 7, a center-side optical filter 6 for blocking test light and 1.55 μm band light and transmitting the 1.3 μm signal light is disposed in the signal light input port.

FIG. 31 shows an example of configuration of the conventional FTM 1, and those parts that correspond to FIG. 29 are referred to by the same reference numerals. The FTM 1 includes an excess cord length holder 21, and an excess cable length storage shelves 22, and on the left of FTM 1, there are optical couplers 2 in each shelf, and the test light splitting fibers 4 separated from each coupler 2 are connected to FS 3 disposed at the bottom section. On the right side, there is an excess cable length storage space having an excess cable length holder 21 and an excess cable length shelves 22 for storing excess cable length of primarily second optical fibers 16.

FIG. 32 shows the structure of a connection section in the conventional FTM 1, and those parts that are the same as those in FIGS. 29, 30 are referred to by the same reference numerals. It includes: optical connector adaptor 23; optical connector 24; single core tape connection section 25. A single-core tape connection section 25 and optical connector 24 are attached to the optical coupler 2.

When transmission service is to be commenced, subscriber cable 17 and FS master side fiber 14 are connected to the coupler 2. Next, the optical connector 24 of the second internal fiber cable 16 is connected to the optical connector adaptor 23 connected to the coupler 2, thereby commencing transmission service.

With increasing access to optical network, more optical fibers are needed to meet the demand of subscribers, and the service centers are required to increase the number of cable per unit floor area in the center. Also, the cable connections are closely meshed for connecting center equipment modules (on-fiber- transaction modules, OLT, modules), star coupler modules and FTM modules. The congestion of cable presents serious operational and maintenance problems.

Also, the lengths of the second internal cable 16 for connecting from the excess cable length assigning holder 21 to the optical coupler 2 are not uniform, excess cable length is inevitably created for the second internal cable 16, and a high cable density in the FTM cannot be achieved without solving the problem posed by excess cable length.

In the conventional FTM, the excess cable length holder 21 and excess cable length storage shelves 22 are used to store excess lengths of second internal cable 16. For new installations and repair of existing optical network, in-use fibers must be separated and untangled from other fibers for switching and connecting operations, and this aspect of the operation was extremely laborious and time-consuming.

SUMMARY OF THE INVENTION

It is a first object of the present invention to provide an optical fiber distribution module that can prevent cord tangling caused by repeated connection/disconnection so that more fiber cords can be introduced to the module to accommodate high density of connecting fibers.

A second object is to provide a cord unit that enables to identify individual cords within a cord unit and a set-type fiber cable based on a group of such fiber cords.

A third object is to provide optical fiber distribution system to enable efficient fiber distribution and switching while providing high density optical fiber cables for the central office as well as for the users.

These objects are enabled by using an optical fiber distribution module comprised by: a connection board with an array of optical connector adaptors for connecting in-use optical fiber cords, and a storage section for storing not-in-use optical fiber cords, wherein a plurality of cord sorting boards having a plurality of fiber cord passageways for accommodating and retaining at least one optical fiber cord is arranged between said connection board and said storage section.

The board sorts a plurality of fiber cords in groups so that in-use cords can be separated by not-in-use cords.

Also, because the load on the cords is suitably supported, tangling of cords is prevented and other fiber cords are protected from being loaded.

Accordingly, high density fibers can be achieved without introducing signal distortions.

Further, because the sorting board prevents cord tangling, work efficiency of fiber connecting and switching operations is improved, and the fiber density on the board can be increased by using miniature connector adaptors and fine fiber cords withe miniature plugs. These improvement would contribute significantly to the future expansion of optical networks.

An optical fiber cord to be used for the distribution board is provided with identifying marks and identifying colors provided on a sheathing.

The set-type fiber cords is comprised by bundling a group of such cords, and said identifying colors provided on said fiber cords are different for different cord units, and said identifying marks are different at least within a given cord unit.

Therefore, by differentiating different cord units by different color dots given to the fiber cords, and differentiating each fiber cord in a given cord unit by different numeric identifying marks, even if the sheath is removed or the cord units are debundled, fiber cords in a desired cord unit can be identified clearly among the many cords, according to the identifying color dots, and a desired fiber cord, containing the target fiber, can be identified among the many fiber cords on the basis of the numeric identifying marks. Thus, the efficiency of working on the fiber distribution board is significantly improved, and fiber switching service to the subscriber can be provided quickly and correctly to enhance future development of optical communication technology.

The distribution board and the cord units of the present invention are most effectively used in an optical fiber distribution system comprised by: a center-side terminating section for terminating a plurality of first fiber cables connected to center terminal equipment; a user-side terminating section for terminating a plurality of second fiber cables connected to a plurality of subscriber terminal equipment; a cross connecting section for switching any optical fiber of said first fiber cable with any optical fiber of said second fiber cable; a fiber distributing section for connecting any optical fiber from said center-side terminating section to said cross connecting section; and a fiber distribution module having a test accessing section for operating said first fiber cable and said second fiber cable, and a fiber switching section for switching input/output ports for operating said test accessing section.

The present optical fiber distribution system enables to organize the internal cables in the equipment center for efficient management of providing communication services by preventing congested fiber passages.

BRIEF DESCRIPTIONS OF THE DRAWINGS

FIG. 1 is a perspective view of a fiber distribution board in Embodiment 1.

FIG. 2 is a perspective view of a sorting board in Embodiment 1.

FIG. 3 is a perspective view of another sorting board in Embodiment 1.

FIG. 4 is a perspective view of still another sorting board in Embodiment 1.

FIG. 5 is an external view of a fiber cord in Embodiment 2.

FIGS. 6A, 6B are schematic representations of set-type fiber cords based on the fiber cord shown in FIG. 5.

FIG. 7 is a front view of a fiber distribution board for the set-type fiber cords shown in FIG. 6.

FIG. 8 is an external view of a variation of the fiber cord in Embodiment 2.

FIG. 9 is an external view of another variation of the fiber cord in Embodiment 2.

FIG. 10 is an external view of yet another variation of the fiber cord in Embodiment 2.

FIG. 11 is an external view of still another variation of the fiber cord in Embodiment 2.

FIG. 12 is an external view of further variation of the fiber cord in Embodiment 2.

FIG. 13 is an external view of still further variation of the fiber cord in Embodiment 2.

FIG. 14 is an external view of yet further variation of the fiber cord in Embodiment 2.

FIG. 15 is a schematic diagram of the equipment configuration in a center of optical fiber distribution system in Embodiment 3.

FIG. 16 is an illustration of the distribution system and the connection with other equipment inside the center in Embodiment 3.

FIG. 17 is an illustration of the system in Example 3, Embodiment 3.

FIG. 18 is an illustration of the system in Example 3, Embodiment 3.

FIGS. 19A–19E are illustrations of the fiber jumper method of fiber switching in Embodiment 3.

FIG. 20 is a front view of a part of the connection board in Example 9, Embodiment 3.

FIG. 21 is a schematic diagram of the system in Example 9, Embodiment 3.

FIG. 22 is a schematic diagram of the system in Example 10, Embodiment 3.

FIG. 23 is a schematic diagram of the system in Example 10, Embodiment 3.

FIGS. 24A, 24B are schematic diagrams of a splitting jumper section in the system in Example 10, Embodiment 3.

FIGS. 25A, 25B are schematic diagrams of a non-splitting jumper section in the system in Example 10, Embodiment 3.

FIG. 26 is a schematic diagram of the system in Example 11, Embodiment 3.

FIG. 27 is a schematic diagram of the system in Example 12, Embodiment 3.

FIGS. 28(a) & (b) (c) are a schematic diagram of the system in Example 13, Embodiment 3.

FIG. 29 is a block diagram of a center based on the conventional FTM.

FIG. 30 is an illustration of a center based on the conventional equipment.

FIG. 31 is a front view of the conventional FTM with optical couplers and FS.

FIG. 32 is a perspective view of the connection section of a conventional FTM.

DESCRIPTION OF THE PREFERRED EMBODIMENTS

Preferred embodiments will be presented with reference to the drawings for three groups of embodiments: in Embodiment 1, examples are related to optical fiber distribution modules; in Embodiment 2, examples are related to types of fibers and groups of fibers and their identification means; in Embodiment 3, examples are related to optical communication systems using the fiber distribution boards and cable presented in Embodiments 1 and 2.

Embodiment 1

FIG. 1 shows a configuration of an optical fiber distribution module in Embodiment 1, and includes a distribution MODULE 101, a connector board 102, a holding board 103 disposed in a separate location of the MODULE, an optical fiber cords 104 having a connector plug 105 at one end, a trunk entry section 106 for admitting optical fiber cords 104 (or fiber cable) into the MODULE 101, a cord sorting board 107 disposed between the connector board 102 and the holding board 103.

The connector board 102 is an array of optical connector adaptors 108 for making plug-to-plug connection of optical connector plugs 105. The holding board 103 has a plurality of engaging sections (not shown) for engaging the connector plugs 105, and is used to hold those cords 104 that are drawn in through the trunk entry section 106 but are not being used.

The cord sorting board 107 is an array of sorting clips 110 arranged vertically on the sorting clip attachment frame 109.

FIG. 2 shows details of the sorting clips 110, each clip being u-shaped, and each right and left arm members 111, 112 has respective fiber cord entry/exit passageways 113, 114 for receiving/retaining at least one fiber cord in approximately horizontal position. Slot openings (or open/close type slots) 113a, 114a are formed contiguously with the passageways 113, 114 to enable inserting or disconnecting the fiber cord 104 in the cord passageways 113, 114.

It means that the cord sorting board 107 has a plurality of fiber cord passageways 113, 114 arranged in a vertical array.

In this configuration, all the fiber cords 104 drawn from the trunk entry section 106 into the distribution MODULE 101 are passed through suitable cord entry passageway 113 on the cord sorting board 107, and the fiber cords 104 that are to be connected (in-use) are passed through the cord exit passageway 114 and are looped towards the connector board 102 to be connected to the connector adaptor 108. On the other hand, those fiber cords 104 that are to be stored are not inserted into the cord exit passageway 114 and are looped towards the holding board 103 to be stored as spare cords.

When a fiber cord 104 held in the holding board 103 is to be connected, the connector plug 105 is disengaged from the engaging device on the holding board 103, and the fiber cord 104 is manually pulled in the vicinity of the cord sorting board 107 and after disentangling from other cords, and the connector plug 105 is connected to a desired connector adaptor 108 on the connector board 102. The newly connected fiber cord 104 is inserted through the slot opening 114a into the cord exit passageway 114.

In a similar manner, any fiber cord 104 that is connected to the connector board 102 can be switched to other connector adaptor 108 or removed to the holding board 103.

The design of assigning the fiber cords 104 from one cable in one sorting clip 110, fiber cords in one cable can be separated from those in other cable, and tangling of fiber cords 104 can be prevented. Also, by providing many sorting clips 110 to a cord sorting board 107, cords are not subjected to undue stresses, and consequently light transmission quality of the fibers can be maintained so that, compared with the MODULEs of conventional designs, more cable can be stored thus increasing the density of fiber cords in the distribution board.

FIG. 3 shows another example of the sorting board. In this design, the exit arm 121 of the sorting clip is provided with two exit passageways. The sorting clip 120 is u-shaped, and the entry arm 121 has the same entry passageway 123 while the opposing exit arm 122 has two exit passageways 124, 125. Slot openings 123a, 124a, 125a are provided contiguously to reach the cord passageways 123, 124, 125.

In this configuration, all the fiber cords 104 drawn into the distribution MODULE 101 from the trunk entry section 106 are passed through suitable cord entry passageway 123, and of the fiber cord 104, those that are to be connected (in use) are passed through the first cord exit passageway 124 and are looped towards the connector board 102 to be connected to the connector adaptor 108. On the other hand, those fiber cords 104 that are to be stored are passed through the second cord exit passageway 125 and are looped towards the holding board 103 to be stored as spare cords.

When a fiber cord 104 held in the holding board 103 is to be connected, the connector plug 105 is disengaged from the engaging device on the holding board 103, and the fiber cord 104 is manually pulled in the vicinity of the cord sorting board 107 until the connector plug 105 reaches the location of the second cord exit passageway 125, and after disentangling from the bunched cords, the cord 104 is removed from the second cord exit passageway 125 through the slot opening 125a, and then the connector plug 105 is connected to a desired connector adaptor 108 on the connector board 102. The fiber cord 104 is inserted through the slot opening 124a into the first cord exit passageway 124.

In a similar manner, any fiber cord 104 that is connected to the connector board 102 can be switched to other connector adaptor 108 or removed to the holding board 103.

FIG. 4 shows another example of the sorting board, which is shaped as a frame, and the cords enter the distribution MODULE from the rear of the frame, and exit to the front of the frame. A sorting clip 130 has a cord entry frame 131, which has a cord entry passageway 133, and an opposing cord exit frame 132 has cord exit passageways 134, 135. Slot openings 133a, 134a, 135a are provided respectively for the passageways 133, 134, 135.

In this example, the cord exit passageways 134, 135 correspond to the first and second cord exit passageways 124, 125 shown in FIG. 3, and their function/effects are the same as those presented for FIG. 3.

Optical fiber cords that can be used with the sorting board include those optical fiber cords that connect to optical component parts. In such a case, a number of cords that connect various component parts can be bundled into one cable and arranged using the sorting board to achieve the same operation.

As explained above, by using the sorting board for connection and switching of connection, optical fiber cords are prevented from becoming tangled, and those cords in use can be clearly separated from those cords that are in storage. Therefore, even if connecting and switching are repeated many times, tangling of fiber cords can be avoid.

Embodiment 2

Embodiment 2 presents optical fiber cords and a fiber cord bundles that include a number of fiber cords.

FIG. 5 shows an example of the external appearance of an optical fiber cord 210 and FIG. 6 shows examples of type of fiber cord bundles in Embodiment 2, and FIG. 7 shows a view of the connections made in the distribution MODULE by using the set-type fiber cords shown in FIG. 6.

As shown in FIG. 5, an optical fiber cord 210, having an optical fiber packaged inside, is identified by numeric identifying marks 212 imprinted along the longitudinal sheath 211 at a suitable spacing (preferably about 20~50 mm apart). These marks 212 consist of two digits and are imprinted transversely in such a way that each pair of digits is inverted with respect to its neighboring pair. Also, identifying color dots 213 are imprinted on the sheath 211 at a suitable spacing (preferably about 20~50 mm apart) in the longitudinal direction at a suitable spacing (preferably about 20~50 mm apart).

Several such optical fiber cords 210 are bundled to form a cord unit 300, as shown in FIG. 6, and such cord units are bundled to form a fiber cord set 310 (refer to FIG. 6A), or a fiber cable 320, which is a fiber cord set 310 encased in a sheath 321 (refer to FIG. 6B).

Therefore, by differentiating different cord units 300 by different color dots 213 given to the fiber cords 210, and differentiating each fiber cord 210 in a given cord unit 300 by different numeric identifying marks 212, even if the sheath 321 is removed or the cord units 300 are debundled, fiber cords 210 in a desired cord unit 300 can be identified clearly among the many cords 210, according to the identifying color dots 213, and a desired fiber cord 210, containing the target fiber, can be identified among the many fiber cords 210 on the basis of the numeric identifying marks 212.

The fiber distribution board and the coded fiber cords 210, shown in FIG. 7, are used in the following manner to achieve quick fiber switching. Cable 320 are brought into the board, and in-use fiber cord sets 310 are routed to external service side while not-in-use fiber cord sets 310 in the same cable 320 are stored in the holding board 204. The in-use fiber cords 210 in a fiber cord set 310 are extended and individually plugged into the connection board 202 of the fiber distribution board 201 while retaining the fiber cords 210 from the same fiber cord set 310 in the sorting board 203. When a fiber on the connected board 210 is to be switched, a desired core fiber among the many fiber cords 210 can be identified quickly according to the color dots 213 and numeric identifying marks 212.

Thus, the efficiency of working on the fiber distribution board 201 is significantly improved, and fiber switching service to the subscriber can be provided quickly and correctly to enhance future development of optical communication technology.

Also, as shown in FIG. 5, because the color dots 213 and numeric identifying marks 212 are repetitively imprinted along the longitudinal sheath 211 of each fiber cord 210, each cord can be identified at any point along the length of the cord.

Also, as shown in FIG. 5, because the color dots 213 and numeric identifying marks 212 are imprinted transversely and every other marks 212 are inverted, a desired cord 210 can be identified visually from any angle of view of the worker.

Further, in the present embodiment, although the color dots 213 are imprinted on the cord 210 longitudinally, but as shown in FIG. 8, a fiber cord 220 may have a longitudinally extending color fiber 223 imprinted on the sheath 211.

Also, as shown in FIG. 9, a fiber cord 230 may have color patches 213 and numeric identifying marks 212 imprinted transversely (preferably at two equidistant locations) or, as shown in FIG. 10, a fiber cord 240 may have color fibers 223 and numeric identifying marks 212 imprinted transversely (preferably at two equidistant locations). Such fiber cords 230, 240 can be easily identified visually even if they become twisted in use.

Also, the fiber cord 210, 220 are easily identified from any direction by having inverting numeric identifying marks 212 that are right side up and transverse to the sheath 211, but as shown in FIG. 11, fiber cords 250, 260 may numeric marks 252 that are arranged on a fiber along the sheath 211 and neighboring digits are inverted so that each fiber cord can be identified visually from any longitudinal direction.

In the foregoing examples, color dots 213 and color fiber 223 are imprinted along the sheath 211, but other arrangements for identification are possible, for example, as shown in FIGS. 13, 14. Such fiber cords 270, 280 have a sheath 271 made of a colored polymeric resin for identification.

Also, in the present embodiment, fiber cord 210 has numeric identifying marks 212 consisting of two digits on the sheath 211, but alpha-numeric marks can be used on the sheath for identification purposes.

Also, it is sufficient that the numeric identification (ID) marks 212 are different within a given fiber unit 300, but the fiber cords in all the fiber units may be given different IDs.

Embodiment 3

Embodiment 3 presents various examples of the optical fiber distribution system of the present invention.

EXAMPLE 1

FIG. 15 shows a configuration of an equipment center that includes an integrated fiber distribution system, and FIG. 16 shows a method of connecting the integrated fiber distribution system with other equipment within the equipment center.

The integrated distribution module 401 includes: an optical coupler 402; optical fiber selection device (FS) 403; center communication equipment 407; center CATV equipment 408; center equipment frame 409; star coupler frame 410; test equipment module (TEM) 411; first internal cable 415; subscriber cable 417; test accessing section 426; cross connecting section 427; splitting section 428; fiber distributing section 429; optical fiber switching section 430; portable terminal 431; intermediate distribution managing section 432; integrated distribution managing section 433; data communication network 434; external equipment operating systems 435; integrated distribution module (IDM) 436; fiber distribution managing section 437 for managing distribution information, components information and circuit information within the IDM; equipment interface 439; test equipment selecting section 471 for selecting optical testing section, monitoring section or optical power comparing section; fiber testing section 472 for testing fibers in cable; monitoring section 473 for testing signal light and test light; optical power comparing section 474 for comparing optical fibers; center-side terminating section 480; and user-side terminating section 481.

The first internal cable 415 extending from the center equipment termination unit center equipment is connected to the first terminal of the integrated distribution module 401, and the subscriber cable 417 is connected to the second terminal of the integrated distribution module 401. The integrated distribution module 401 is connected to TEM 411 through the equipment interface 439.

The fiber distributing section 429 distributes the first internal cable 415 to a number of cross connecting sections 427 and splitting sections 428 provided in the IDM 436. The splitting section 428 distributes signal light from the center communication equipment 407, 408 to several output ports. The cross connecting section 427 switches any optical fibers of fiber distributing section 429 and splitting section 428 to any optical fibers of second fiber cable 417. The test accessing section 426 injects light into optical fibers in the first internal cable 415 and the second fiber cable 417. The fiber switching section 430 selects input/output ports for the test accessing section 426.

The integrated distribution module 401 of such a design enables not only to integrate several separate functions that exist in the conventional system, but also simplifies the distribution paths within the equipment center by newly providing the fiber distributing section 429, and achieves economy in equipment by integrating various functions.

In other words, as explained with reference to FIG. 29, in the conventional design, a plurality of signal paths exist in the internal fiber distribution connecting the OLT module 9, a star coupler frame 10 and FTM 1. Therefore, a large number of first and second internal fiber cable 416, 415 is required, resulting in serious cable congestion. In contrast, in the examples shown in FIGS. 15, 16, the fist internal cable 415 from the OLT frame 409 is totally accommodated in the fiber distributing section 429 of the IDM 436, enabling simpler connections based on multi-fiber first internal cable 415. Also, inside-center connections between the star coupler 10 and FTM 1 in the conventional design are integrated within the IDM 436 in the present design, and are under the management of the integrated distribution module 401.

EXAMPLE 2

In this example, the optical fiber switching section 430 is connected to test equipment module 411 comprised by fiber testing section 472, monitoring section 473, optical power comparing section 474 and test equipment selecting section 471 for selecting the optical testing section, monitoring section or power comparing section. The fiber testing section 472 has a capability of monitoring the signal light and test light, and the optical power comparing section 474 has a capability of comparing optical fibers. This system design enables to test the quality of newly installed subscriber cable 417 and maintenance of existing cable.

EXAMPLE 3

FIGS. 17, 18 show a system comprised by: a base module 440 of IDM 436; addition modules 441 of IDM 436; test accessing unit 442; sorting board 443; holding board unit 444; coupling fibers 445; fiber distribution unit 446; connection board 447; internal cable fixation section 448; holding board 449; and third internal cable 450.

The IDM base module 440 of the IDM 436 is comprised by: test accessing section 426; cross connecting section 427; splitting section 428; fiber distributing section 429; fiber switching section 430. The addition module 441 is comprised by: test accessing unit 426; cross connecting section 427; splitting section 428; and optical fiber switching section 430. The test accessing unit 442 is comprised by: test accessing section 426; and fiber switching section 430, and the cross connecting section 427 is comprised by coupling fibers 445 and connection board 447; and the fiber distribution unit 446 has a capability of connecting one IDM base module 440 to a plurality of addition modules 441. By including the addition module 441 in the design, it becomes possible to maintain the managing capability of optical fiber distribution functions regardless of increases in the number of core fibers in the cable.

Fiber switching is carried out by the cross connecting section 427 in conventional IDM 436, but, in this case, this is achieved by switching the coupling fibers 445 connected to the connection board 447. Because the number of cores that can be accommodated in the conventional FTM is limited, there is possibility of encountering some switching events that cannot be handled within a single FTM, but in the present example, such a problem does not arise because the inside-center optical fibers are managed totally by the integrated distribution module 401.

Also, in the present example, the fiber distributing section 429 is able to switch fibers beyond the cross connecting section 427, so that any fiber connections between the subscriber data terminal device 407 and the subscriber cable 417, as well as any connections between the center CATV equipment 408 and the subscriber cable 417 can be selected and connected freely. Also, because the star coupler unit 10 and FTM 1 are integrated in the present system, the space requirement is lessened, and the density of core fibers that can be accommodated within the center can be increased.

FIG. 18 shows a method for connecting the IDM 436 of the present distribution system to various conventional equipment within the center. Conventional FTM 1 is connected to the optical multi/demultiplexer in the star coupler frame 410 through the second internal fiber cable 416, and the star coupler frame 410 is connected to the fiber distribution unit 446 in the IDM base module 440 through the third internal fiber cable 450.

The present system incorporates conventional inside-center equipment so that the integrated distribution module 401 is able to offer total control including those internal fiber cable connecting conventional inside-center equipment, thereby simplifying the distribution system inside the equipment center, and avoiding fiber congestion of data fibers inside the center.

EXAMPLE 4

In this system, the fiber distribution managing section 437 is provided with the portable terminal 431, intermediate distribution managing section 432 and integrated distribution managing section 433. The intermediate distribution managing section 432 has databases to manage distribution information inside the IDM 436, components information and circuit information, and has a capability to command fiber switching tasks. The portable terminal 431 has a capability to exchange information on work content (such as fiber switching) by referencing the databases in the intermediate distribution managing section 432, and provides support to the workers performing the task of fiber switching. The integrated distribution managing section 433 compiles and manages distribution information from a plurality of intermediate distribution managing sections 432, and manages connections to external operating systems 435. The fiber distribution managing section 437 of the present system enables effective management of equipment information and interfacing with external operating systems 435, as well as provide operational support to workers carrying out operational tasks.

EXAMPLE 5

In this system, the cross connecting section 427 uses a sorting board based on the jumper method. FIG. 19 shows the system configuration which includes: optical connector adaptor 423; optical connector 424; sorting board 443; coupling fibers 445; connection board 447; holding board 449; cord stopper 451; and excess length storage section 454.

A method of switching of coupling fiber 445 on the sorting board 443 will be explained in the following. The coupling fibers 445 are supported loosely on the sorting board 443 so as to permit sliding so that the excess cord length of the coupling fibers 445 is stored in the excess length storage section 454 provided in the front and back surfaces of the system apparatus. When fiber switching is required, and even if there is a long excess length of coupling fiber 445, the optical connector 424 can be pulled right up to the front of the sorting board 443, so that the required work can be carried out effectively and with visual confirmation. Switching of the coupling fiber 445 is carried out by disconnecting the optical connector 424 of the coupling fiber 445 inserted in the first optical connector adaptor 423 on the connection board 447 and inserting into the second optical connector adaptor 423 provided on the connection board 447.

FIG. 19A shows a schematic representation of the optical connector 424 of the coupling fiber 445 coupled on the first optical connector adaptor 423. In FIG. 19B, the optical connector 424 is decoupled from the first optical connector adaptor 423. In FIG. 19C, the coupling fiber 445 having the decoupled connector 424 is pulled from the back of the sorting board 443 until the stopper is in the vicinity of a viewing hole provided on the sorting board 443. This step enables to select?? confirm?? a desired optical connector 424 from the excess length front storage section 454, which stores excess length of many cords.

FIG. 19D shows the excess length of the coupling fiber 445 being pulled to the front side to a required length to grasp the connector 424 so that the coupling fiber 445 can be pushed through the slot opening, located next to the decoupled fiber on the sorting board 443, and the optical connector 224 is then connected to the second optical connector adaptor 423 on the connection board 447. FIG. 19E illustrates balancing of the excess length in the front and back storage sections 454.
EXPLANATION DOES NOT MAKE SENSE The present system enables to select the cord and connector visually even if there is excess length of cords so that coupling fibers and connectors can be easily identified and selected to shorten the time required for fiber switching.

EXAMPLE 6

In this system, the coupling fiber 445 shown in FIG. 19A is identified by bar codes imprinted at a location 453 of the fiber 445, which are read by a portable terminal 431. This system thus enables to shorten the time required for searching for a correct coupling fiber 445 to improve the work efficiency and decrease erroneous selection of coupling fiber 445.

EXAMPLE 7

In this system, the connection board 447 and the holding board unit 444 are provided with a display section for displaying instruction data from the intermediate distribution managing section 432. FIG. 20 shows a part of the connection board 447, and an array of connector adaptors 423 is identified by the corresponding LED indicators 452 provided in the vicinity. The indicators 452 indicate the coupling terminals to be serviced on the connection board 447, and the indicators 452 provided on the holding board unit 444 indicate the coupling fiber 445 to be serviced. This system enables to search the connection sections on the connection board reliably and quickly so that fiber switching operation can be carried out efficiently and prevent errors in selecting the cords to be switched.

EXAMPLE 8

In this system, a visible light source is provided for the fiber switching section 430, and the coupling fiber 445 is provided with a light deflection section to transmit visible light. The light from a visible light source is injected in a FS master side fiber, and propagates to the coupling fiber 445 through the connection board 447, and the light is leaked externally through the deflection section provided on the coupling fiber 445 stored in the front and back excess length storage sections. This leaked light is observed visually to identify a desired coupling fiber 445. This system enables to select a desired coupling fiber 445 from the back side of the sorting board 443 to improve the work efficiency of fiber switching and prevent erroneous switching.

The visible light source includes semiconductor lasers, He-Ne lasers.

EXAMPLE 9

In this system, an error-free switching method is applied on the cross connecting section 427. FIG. 21 shows the configuration that includes: optical fiber selector (FS) 403; subscriber cable 417; holding board unit 444; coupling fiber 445; connection board 447; first optical coupler 455; second optical coupler 456; optical coupler A port 457; optical coupler B port 458; optical coupler C port 459; optical coupler D port 460; optical pulse tester 461; visible light source 462; optical monitor device 463; #1 connector 464; and #2 connector 465.

Signal light exiting from the coupling fiber 445 reaches subscriber cable 417 after successively propagating through the #1 connector 464, port B 458 and port A 457 of the first optical coupler 455. Optical couplers 455, 456 produce splitting, so that: light entering from port A 457 is split to port B 458 and port C 459; light entering from port B 458 is split to port A 457 and port D 460; light entering from port C 459 is split to port A 457 and port D 460; and light entering from port D 460 is split to port B 458 and port C 459. Each port A 457 is connected to the subscriber cable 417.

In the initial stage, the coupling fiber 445 is connected to the #1 connector 464, and the following explanation relates to a case of switching the coupling fiber 445 to the #2 connector 465.

First, the operator at the equipment center enters change items for the structure of the network, including subscriber information, service information, to the portable terminal 431, intermediate distribution managing section 432 or integrated distribution managing section 433. Next, all the request for connection switching made to sections other than the intermediate distribution managing section 432 are all transferred to the intermediate distribution managing section 432. The intermediate distribution managing section 432, referring to its own database, determines the coupling fiber 445, #1 connector 464 and #2 connector 465 involved in the fiber switching operation. Identifying information for the coupling fiber 445, #1 connector 464 and #2 connector 465 are forwarded to the portable terminal 431 so that the worker may work according to the information provided.

Next, the intermediate distribution managing section 432 issues a command to FS 403 to connect port D 460 on the first coupler 455 and the optical monitor device 463, and when the FS 403 executes the command in response, the monitor device 463 begins monitoring signals from the coupling fiber 445 in the current condition.

Next, the center worker selects the fist connector 464 indicated on the portable terminal 431, and confirms the coupling fiber 445 attached to the connector 464. In this case, reading the bar codes provided on the coupling fiber 445 with the portable terminal 431 would enable to carry out the task more reliably. When there is no error in selection of the coupling fiber 445, the portable terminal 431 outputs disconnect instruction for the fiber 445, and the worker, upon confirming the instruction, carries out the disconnection operation of the coupling fiber 445.

When the coupling fiber 445 is decoupled, the signal being monitored by the monitor device 463 is disconnected. The monitor device 463 reports the signal disconnection to intermediate distribution managing section 432. Upon receiving the report, intermediate distribution managing section 432 issues a command to FS 403 to connect the port D 460 on the second coupler 456 to the monitor device 463. When the FS 403 executes this operation, visible light emitted from the visible light source 462 is emitted from the port B 458 on the second coupler 456, that is, from the #2 connector 465. The worker confirms the connector 465 because of the light emitted from the connection board 447, and reports confirmation to the portable terminal 431. Confirmation report is transferred from the portable terminal 431 to the intermediate distribution managing section 432.

Next, the intermediate distribution managing section 432 issues a command to the FS 403 to connect port D 460 on the second coupler 456 to the monitor device 463, and when FS 403 executes the operation in response, the monitor device 463 waits for signal to be transmitted from the #2 connector 465. Further, the intermediate distribution managing section 432 issues a connection instruction for the #2 connector 465 to the worker. The worker connects the coupling fiber 445 to the #2 connector 465 according to the instruction on the portable terminal 431.

When the coupling fiber 445 is correctly connected to the #2 connector 465, the monitor device 463 receives signal light from the coupling fiber 445, and reports the connection event to the intermediate distribution managing section 432. Upon receiving connection report, the intermediate distribution managing section 432 notifies the worker through the portable terminal 431 that connection has been made, and commands FS 403 to return to the initial position, and make changes to own database. This system thus assures reliable and quick operation.

EXAMPLE 10

FIG. 22 shows the a view of the distribution system in Example 10, comprised by: distribution board 501; cross connecting section 502; fiber sorting section 503; fiber storage section 504; splitting jumper section 505; cord storage section 506; user-side terminating section 507; non-splitting jumper section 508; fiber sorting section 509 having a plurality of fiber sorting sections 503; center-side terminating section 510; first internal cable 511; subscriber cable 512; center terminals frame 513 housing center communication equipment and center imaging equipment; connector plug 551; and splitter 552.

However, FIG. 23 shows a case of using splitting jumper section 505, but instead of this jumper section 505, non-splitting jumper section 508 may be used.

The center-side terminating section 510 houses the first internal cable 511 connected to a plurality of subscriber center devices, and is connected to the jumper section 508. Jumper section is broadly divided into those that have splitting capability (FIG. 24) and those that do not (FIG. 25). A splitter divides signal light transmitted from a subscriber center to several ports, and although the number of divisions is not specially limited, four, eight and sixteen ports are useful in relation to center capabilities.

Here, FIG. 24 shows a schematic diagram of the splitting jumper section 505 and FIG. 25 shows a schematic diagram of the non-splitting jumper section 508, and include input port 560; splitter 561; output-side port 562; and optical filter 563. Splitter 561 divides signal from the center-side to a plurality of ports.

Signal light may be comprised by different wavelengths for the data fibers and imaging fibers, and they may be combined suitably to suit the number of ports to be sent out from the output ports. Non-splitting jumper section 508 is used to transmit signal light from the center terminals frame 513 to a particular subscriber without splitting, and is comprised by a plurality of input ports and respective output ports. Splitting jumper section 505 and non-splitting jumper section 508 are both made in the same shape so as to enable to be installed in any desired area in the jumper fiber sorting section 509.

The fiber sorting section 503 provides the following functions:

(1) houses optical fibers having connector plugs connected to the output ports of the jumper section 505, 508 and separates the in-use fibers from the in-storage fibers;

(2) provides entry/exit passageways for in-use fibers and storing fibers;

(3) maintains a certain bending arc of the fibers in the storage section;

(4) able to switch in-use fibers with storing fibers in the openings;

(5) restrains sorted fibers so as not be detached easily;

(6) has a fiber pulling capability including a rotary capability;

(7) provides a space for enabling to visually identify imprinted ID marks.

Furthermore, the fiber sorting section 503 is designed to completely separate the inuse fibers from the storing fibers so that the stored fibers do not adversely affect the properties of the in-use fibers. Also, because the pulling means and visual observation means are provided, even if another fiber sorting section 503 is over laid on the existing fiber sorting section 503, in-use fibers from any sorting section 503 can be visually distinguished from the storing fibers. These functions are used to identify a desired fiber cord and the connector plug attached at the cord end can be pulled up to the face of the fiber sorting section 503 to confirm the identification.

The connector plug pulled in closer for confirmation can now be connected to the new connection position in the cross connecting section 502. This approach enables to avoid generating twisting of the fibers. In the conventional approach, fiber storing density could not be increased, because repeated switching causes the fibers to become twisted over time.

Optical fibers connected to output port of the jumper sections 505, 508 need to be protected with sheathing of certain tensile strength and bending elasticity, therefore, a sheathing structure comprised by a stretch resistant material and a polymeric material is suitable. Sheathing polymeric materials used were anti-flammatory polymers, which included: non-halogenic polymers such as polyolefin group resins; polyamide group resins; polyester group resins. Anti-flammatory polymers included anti-flammatory agents not containing organic phosphorous group substances.

In order to increase the fiber density in the distribution board, optical cords having a diameter of the order of 1 mm are satisfactory. Those fibers housed in the jumper section 505 (508) having core fibers in a range of 32~64 cores exhibit superior handling and storing characteristics.

Methods of visual identification of fibers include identifying marks having numeric information. Identification was improved by using a combination of symbols/numerals markings pertaining to a cord, and colored sheathing or color printed sheathing to identify a particular fiber core in a multi-core cord. Marking information was provided transversely across the sheath singly or in multiple markings or along the sheath longitudinally spaced apart at a given spacing so that any location along the cord can be identified from any position along the cord, and when the marking information was provided in various orientations with respect to the sheath, the cord can be identified from any viewing angle.

The fiber sorting section 509 can contain several jumper sections 505 (508). Storing methods include vertical or horizontal accommodation, and the fibers can be arranged in each of these method so that a single fiber of fibers or multiple fibers of fibers can be stored in a horizontal or slanted orientation.

The length of jumper fibers in the jumper sections 505 (508) should be made a constant length to reach any part of the cross connecting section 502. This is most easily achieved by a vertical single fiber storing method. In such a method, the jumper sections 505 (508) can be incorporated in the fiber sorting section 503, and arranging the fiber sorting section 509 from the bottom to the top region of the MODULE. This method allows to increase the number of jumper sections 505 (508) without adversely affecting the in-use fibers.

To store the excess lengths for the in-use fibers in the fiber storage section using the vertical single fiber storing method, the positions of the cross connecting section 502 and fiber sorting section 509 should be higher than the middle of the fiber distribution unit.

The cross connecting section 502 is connected to the subscriber by connecting one end of the cross connecting section 502 to the subscriber cable. Therefore, by incorporating the various jumper section 505 (508) in the fiber sorting section 503, transmission service to subscribers can be provided by switching at the cross connecting section 502.

EXAMPLE 11

FIG. 26 shows an example of the fiber distribution system storing the first internal cable directly in the fiber sorting section.

After storing several first internal cable 511 distributed from the center terminals frame 513 inside the center-side terminating section 510, the fibers from the first internal cable 511 are stored in the fiber sorting section 503. The fibers are single core fibers and an optical connector is attached to one end.

This fiber sorting section 503 performs the same function as the fiber sorting section shown in FIG. 22. However, because each fiber has a connector plug attached at the end, when storing them in the fiber sorting section 503, it is necessary to provide entry/exit passageway for the fiber so that the fibers would not come loose from the clips, by providing properly shaped slot opening or open/close type slots. This system is useful when it is desired to provide a dedicated service at the center on a one-on-one basis, or when the subscriber cable time-shares signal light with subscribers.

EXAMPLE 12

FIG. 27 shows a configuration of an integrated fiber distribution system provided with IDM distribution board A (520) and IDM distribution board B (521), and has a distribution managing function and a testing function.

It is obvious that a distribution system may be comprised only with IDM distribution board A (520) and IDM distribution board B (521), and in such a system, one IDM distribution board B (521) can accommodate many IDM distribution boards A (520).

IDM distribution board B (521) is situated between a plurality of subscribers linked to the IDM distribution board A (520) and a plurality of center terminals frames 513, and has a function of assigning the fibers. In a system that does not have an IDM distribution board B (521), there will be not only a need for providing an extensive network of fiber cable between the IDM distribution board A (520) and many subscriber equipment, but also a need to have on-hand a large variety of fiber cable, those having a low number of cores and those having a high number of cores. By providing the IDM distribution board B (521), multi-core fiber cable can be installed in the fore-stage of the system to avoid the difficulty of dealing with congestion of fiber cable.

IDM distribution board A (520) has the equivalent functions as the board 501 shown in FIG. 22, and IDM distribution board B (521) has the equivalent functions as the board 501 shown in FIG. 26. IDM distribution board A (520) and IDM distribution board B (521) are connected with IDM cable 516. IDM distribution board B (521) has a fiber sorting section 503 for the IDM cable 516 and IDM distribution board A (520) has a jumper section.

This configuration is sufficient for a fiber distribution system, but by incorporating a testing function in the distribution system, operational status of the fibers, from the center equipment to subscribers, can be maintained and monitored in the system. Testing function includes a test accessing section 514 having an optical coupler for injecting test light from the vicinity of the cross connecting section 502 into fibers on the center-side or fibers on the subscriber side. Other testing components include fiber switching section 530 for switching test light to be injected into a plurality of test accessing section 514 and an optical testing 533 for measuring and analyzing forward and return test light.

The system may further include a monitoring section 535 for monitoring signal light, an optical power comparing section 536 for comparing the performance of cores. Parts for the optical testing section can be accommodated in the lower section of either the cross connecting section or the IDM distribution board B (521).

The test accessing section 514 is connected to the subscriber cable at one end, and at other end, to the cross connecting section 502 having many receptacles. These receptacles have traditionally been SC type, but the fiber density on the distribution board can be increased by using a smaller MU type 16-string receptacle so that the capacity of cross connection may exceed 4,000 terminals.

For connecting to the subscriber cable, an 8-core multi-core connector (MT type) may be used. For example, two 8-core multicore connectors may be joined at about 10 mm width in a 16-string receptacle to increase the fiber density. Excess length portion of the tape type core fibers of the subscriber fiber cable may be stored by providing a 10-mm wide partition plate in the center of the test accessing section 514, and storing the tapes on left and right sides of the partition plate. Connection to the fiber switching section may be made using a 16-core multicore connector.

Test light wavelength is different than signal light wavelength so as not to affect communication functions. Also, optical filters are used in the distribution system to avoid affecting the communication equipment adversely. In the present system, optical filters are inserted on the transmission side of the jumper section 508, in order to reduce the number of required filters.

Additional functions can be provided to the present system. For example, by incorporating the distribution managing section 525 in the system, complex distribution of fibers can be performed by computation using database system 524 shown in FIG. 27. Further, it enables to use a bar-code reader 522 provided for the fiber distributing section 517 to read two-dimensional identifying marks 519, optical fibers, cross connecting section 502, and to register the operating status of the system in the database DB. Such an arrangement facilitates the task of managing the system, and increases the efficiency of fiber distribution operation.

Two-dimensional identification codes may be imprinted or bonded on removable tags to be attached to the fiber sheath. One-dimensional codes are typically bar-codes, but a high density distribution system such as those presented in the present invention requires fine diameter fibers, and the identifying marks must also be miniaturized.

Such micro-sized two-dimensional codes are capable of registering 30×30 alpha-numeric markings inside a 5-mm square, and much more information can be represented compared with one-dimensional markings. Such micro-sized markings can also be used for product inventory purposes.

Information regarding the locations of receptacles and adaptors for the cross connecting section 502 and fiber distributing section 517 can be obtained by imprinting or attaching two-dimensional marks on respective protective caps or displaying visual identifying marks on a monitor. Two-dimensional markings are advantageous for automatic registering or altering in databases.

EXAMPLE 13

FIG. 28 shows an example of the configuration of a fiber distribution system having an integrated jumper section 505 and fiber sorting section 503.

IDM cable 515 is connected to input port of the jumper section 505, and optical fibers distributed by a splitter 547 are inserted in the fiber sorting section 503. Those fibers are stored as spare fibers 543 on the fiber storing board 504.

On the other hand, one end of the test accessing section 514 is connected to subscribers through the subscriber cable 512. Other end of the test accessing section 514 serves as the cross connecting section 502.

To provide communication service to a subscriber, a spare fiber is connected to the cross connecting section 502. In this case, the fiber to be connected is identified visually in the identification space 544.

The fiber sorting section 503 has a rotation pulling section 545 to facilitate visual identification of the fibers using identifying marks 550 and color markings 549. Those in-use fibers connected to the cross connecting section 502 are separated completely, from the in-storage fibers so that there is no problem of becoming tangled??? with the in-storage fibers.

By attaching two-dimensional identifying marks 519 on the fiber and cross connecting section 502, information regarding connection status can be automatically registered in the databases. For example, identification process is enhanced by attaching an ID tag 541 on the fiber sheath as illustrated.

In this case, a round shape of the ID tag 541 is suitable to prevent other fibers to catch on the tags. Such identification codes are placed in the vicinity of the connector plug 540, and the ID tag 541 should be made movable along the fiber sheath for adaptability.

It should be noted that the various examples presented above are for illustrative purposes and are not meant to be limiting the invention in any manner. The present invention can be modified within the scope of the claims disclosed.

What is claimed is:

1. An optical fiber distribution module comprising:

a connection board disposed on said module;

optical connector adaptors for connecting in-use optical fiber cords, an array of said optical connector adaptors forming said connection board; and a storage section for storing not-in use optical fiber cords disposed in a separate location of said module, wherein a plurality of cord sorting boards having a plurality of fiber cord passageways for accommodating and retaining at least one optical fiber cord is arranged between said connection board and said storage section, said in-use optical fiber cords being inserted into said fiber cord passageways and connected to said optical connector adaptors, and said not-in use optical fiber cords being inserted into said fiber cord passageways and stored by means of said storage section.

2. An optical fiber distribution module according to claim 1, wherein each of said cord sorting boards is u-shaped or has an approximate frame shape, and includes a plurality of sorting members arranged in one direction, each of said sorting members having fiber cord passages for accommodating/retaining at least one fiber cord in a horizontal direction, and for inserting or removing said fiber cord from said fiber cord passageways.

3. An optical fiber cord, comprising:

an optical fiber cord; and a sheathing for covering said optical fiber cord, wherein identifying marks and identifying colors are provided on said sheathing, and said identifying marks are comprised of one of digits, letters and a combination of digits and letters such that the marks are oriented along the sheathing, and neighboring marks separated at a given spacing are inverted relative to one another.

4. An optical cord according to claim 3, wherein said identifying marks are provided transversely to said sheathing at a given spacing.

5. An optical cord according to claim 3, wherein said identifying marks are provided longitudinally along said sheathing at a given spacing.

6. An optical cord according to claim 3, wherein said identifying colors are provided transversely at a given spacing along the sheathing.

7. An optical cord according to claim 3, wherein said identifying colors are provided longitudinally at a given spacing along the sheathing.

8. An optical cord according to claim 3, wherein said identifying colors are provided continuously and longitudinally along the sheathing.

9. An optical cord according to claim 3, wherein said identifying colors are represented by outer appearance of the sheathing.

10. An optical cord according to claim 3, wherein said sheathing is provided with tags having identifying means.

11. An optical fiber cable or a set-type optical fiber cord comprised by a plurality of cord units, each of said cord units having a plurality of optical fiber cords, each of said optical fiber cords comprising:

an optical fiber cord; and a sheathing for covering said optical fiber cord, wherein identifying marks and identifying colors are provided on said sheathing, and said identifying marks are comprised of one of digits, letters and a combination of digits and letters such that the marks are oriented along the sheathing, and neighboring marks separated at a given spacing are inverted relative to one another, wherein said identifying colors provided on said sheathing are different for different cord units, and said identifying marks are different at least within a given cord unit.

12. An optical fiber distribution system comprising:

a central-side terminating section for terminating a plurality of first fiber cables connected to communication equipment in a central office;

a user-side terminating section for terminating a plurality of second fiber cables connected to a plurality of subscriber terminal equipment;

a cross connecting section for switching any optical fiber of said first fiber cable and/or any optical fiber of said second fiber cable;

a fiber distributing section for connecting any optical fiber from said center-side terminating section to said cross connecting section; and a fiber distribution module having a test accessing section for operating said first fiber cable and said second fiber cable, and a fiber switching section for switching input/output ports for operating said test accessing section.

13. An optical fiber distribution system according to claim 12, wherein said system is provided with a splitting section for distributing signal light from center communication equipment in a central office to a plurality of output ports for outputting to a said cross connecting section.

14. An optical fiber distribution system according to claim 12, wherein said fiber distribution module is provided with a fiber distribution managing section for managing fiber distribution information, parts information and service information within said fiber distribution module.

15. An optical fiber distribution system according to claim 12, wherein said fiber distribution module is provided with an optical testing module having: a fiber testing section connected to a fiber switching section for testing optical fibers; a monitoring section for monitoring signal light and test light; an optical power comparing section for identifying optical fibers; and a test equipment selecting section for selecting one of said fiber testing section, said monitoring section or said optical power identifying section.

16. An optical fiber distribution system according to claim 13, wherein said fiber distribution module is provided with:
- a base module having a central-side terminating section, a user-side terminating section, a fiber distributing section, a splitting section, a cross connecting section, a test accessing section, and a fiber switching section; and
- an addition module having said central-side terminating section, a fiber distributing section, a splitting section, a cross connecting section, a test accessing section, a fiber switching section; in such a way that a plurality of addition modules may be added to said fiber distributing section.

17. An optical fiber distribution system according to claim 14, wherein said fiber distribution managing section is provided with:
- an intermediate distribution managing section having a fiber information managing section, a portable terminal, and an information exchanging section for supplying fiber distribution information and operation support information to said portable terminal; and
- an integrated fiber distribution managing section for managing fiber distribution information received from said intermediate distribution managing section and managing connections with other operating systems.

18. An optical fiber distribution system according to claim 12, wherein said cross connecting section is provided with:
- a holding board for engaging with output fiber ends of a plurality of said first optical fiber cables;
- a connection board having an output section optically fastened to a plurality of said second optical fibers, and an input section including an array of fixed optical connectors for coupling with any movable connectors so as to provide opposing light transmission surfaces;
- a sorting board having a plurality of retaining passageways for loosely holding optical fibers to permit longitudinal sliding; and
- coupling fibers having input ends optically connected to oppose output ends of said first optical fiber cable held on said holding board to provide light transmission surfaces, and output ends having said movable connectors to provide selective optical connections with said connectors on said connection board; and
- a fiber storage section for storing said coupling fibers provided on front and back surfaces of said sorting board.

19. An optical fiber distribution system according to claim 18, wherein said coupling fibers are provided with identifying markings, and a portable terminal having an marking identifying section.

20. An optical fiber distribution system according to claim 18, wherein said connection board and said holding board are each provided with indicators for displaying command data issued from said intermediate distribution managing section.

21. An optical fiber distribution system according to claim 18, wherein said fiber switching section is provided with a visible light source to identify said coupling fibers by bending.

22. An optical fiber distribution board comprising:
- a central-side terminating section for terminating first optical cable optically connected to communication equipment in a central office;
- a user-side terminating section for terminating second optical cable optically connected to subscriber terminal equipment;
- a cross connecting section for switching connections of any optical fiber of said first optical cable with any optical fiber of said second optical cable;
- a fiber sorting section for accommodating said first optical cable and separating optical fibers to be routed to said cross connecting section from optical fibers to be routed to a fiber storage section; and
- a fiber-cord storage section for providing connecting means for optically connecting any optical fiber from said fiber sorting section to any terminal of said cross connecting section.

23. An optical fiber distribution board according to claim 22, wherein said fiber sorting section is provided with fiber pulling means.

24. An optical fiber distribution board according to claim 23, wherein said fiber pulling means include a rotary mechanism.

25. An optical fiber distribution board according to claim 22, wherein said system is provided with a fiber storage section for storing not-in-use optical fibers; and a fiber sorting board for installing said fiber sorting section.

26. An optical fiber distribution board according to claim 22, wherein optical jumper sections are provided between said fiber sorting section and said first optical cable for distributing signal light from a communication equipment to one or a plurality of output ports.

27. An optical fiber distribution board according to claim 26, wherein said optical jumper sections are provided with filtering means for transmitting selected wavelengths of signal light.

28. An optical cord according to claim 4, wherein said identifying marks are provided longitudinally along said sheathing at a given spacing.

29. An optical fiber distribution board according to claim 23, wherein said system is provided with a fiber storage section for storing not-in-use optical fibers; and a fiber sorting board for installing said fiber sorting section.

30. An optical fiber distribution board according to claim 24, wherein said system is provided with a fiber storage section for storing not-in-use optical fibers; and a fiber sorting board for installing said fiber sorting section.

* * * * *